(12) United States Patent
Anasis et al.

(10) Patent No.: US 8,397,382 B2
(45) Date of Patent: Mar. 19, 2013

(54) METHOD OF REPAIRING A WIND TURBINE BLADE

(75) Inventors: George Anasis, Lewis Center, OH (US); Joost Bogaert, Lier (BE); Ricardo Arellano, Independence, KS (US); Gregg Flobeck, Monument, CO (US)

(73) Assignee: Sky Climber Wind Solutions LLC, Delaware, OH (US)

( * ) Notice: Subject to any disclaimer, the term of this patent is extended or adjusted under 35 U.S.C. 154(b) by 623 days.

(21) Appl. No.: 12/684,378

(22) Filed: Jan. 8, 2010

(65) Prior Publication Data

US 2011/0167633 A1    Jul. 14, 2011

(51) Int. Cl.
    *B23P 6/00*    (2006.01)
(52) U.S. Cl. .................................... 29/889.1
(58) Field of Classification Search ............. 29/889.1
    See application file for complete search history.

(56) References Cited

U.S. PATENT DOCUMENTS

| 5,351,783 | A | 10/1994 | Celli |
| 7,521,083 | B2 | 4/2009 | Teichert |
| 7,740,107 | B2 | 6/2010 | Lemburg et al. |
| 2007/0056801 | A1 | 3/2007 | Iversen |
| 2009/0020361 | A1* | 1/2009 | Teichert ............... 182/36 |
| 2010/0135797 | A1* | 6/2010 | Nies ..................... 416/9 |

FOREIGN PATENT DOCUMENTS

| CA | 2341398 A1 | 3/2000 |
| DE | 4339638 A1 | 5/1995 |
| WO | 03048569 A2 | 6/2003 |
| WO | 2007085265 A1 | 8/2007 |
| WO | 2008104272 A2 | 2/2008 |

\* cited by examiner

*Primary Examiner* — David Bryant
*Assistant Examiner* — Moshe Wilensky
(74) *Attorney, Agent, or Firm* — David J. Dawsey; Michael J. Gallagher; Gallagher & Dawsey Co., LPA

(57) ABSTRACT

A method of repairing a wind turbine blade while mounted on a tower without removing the blade from the tower is provided. The method may begin by positioning the wind turbine blade in a substantially vertical orientation. Next, a blade reinforcement structure is secured to the blade to reduce stress on a portion of the blade. The blade is repaired by removing a damaged portion of the blade, and installing a repair portion to the blade where the damaged portion was removed. The method may conclude by removing the blade reinforcement structure from the blade.

40 Claims, 18 Drawing Sheets

METHOD OF REPAIRING A WIND TURBINE BLADE

CROSS REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

TECHNICAL FIELD

The present disclosure relates to wind turbines, and more particularly to a method of repairing a wind turbine blade while mounted on a tower without removing the blade from the tower.

BACKGROUND OF THE INVENTION

Wind turbines are becoming increasingly popular as a means for generating "green" energy. As with other means for generating energy, it is desirable for wind turbines to produce energy with as high a level of efficiency as possible. One of the main things that can significantly lower wind turbine efficiency is damage to a wind turbine blade, and more specifically, damage to the aerodynamic profile of the blade. Thus, in order to operate the wind turbine more efficiently and to prevent further damage, the damaged blade should be repaired in a timely manner.

Depending on the amount of damage and the location of the damage, a blade may be repaired while it is still attached to the tower. For example, small nicks and cracks in the shell of a blade may typically be repaired without having to remove the blade from the tower. However, when the damage affects the aerodynamic profile of the blade, or the damage is located on, or near, the structural backbone of the blade, generally referred to as a spar cap, then the blade is typically removed from the tower and repairs are performed on the ground. The primary reason for removing the blade is so that the blade can be repaired in an environment where the blade is not under any stresses or loads to ensure that the aerodynamic profile of the blade is maintained and not permanently compromised.

What is needed in the art is a method of repairing any type of damage to a wind turbine blade while the blade is mounted on a tower without removing the blade from the tower. The claimed method and the various apparatus associated with performing the method is intended to meet this need.

SUMMARY OF INVENTION

In its most general configuration, the disclosed method of repairing a wind turbine blade advances the state of the art with a variety of new capabilities and overcomes many of the shortcomings of prior methods in new and novel ways. In its most general sense, the disclosed method overcomes the shortcomings and limitations of the prior art in any of a number of generally effective configurations. The various apparatus associated with the method demonstrate such capabilities and overcomes many of the shortcomings of prior devices in new and novel ways.

The disclosure is directed to a method of repairing a wind turbine blade while mounted on a tower without removing the blade from the tower. In one embodiment, the first step of the method includes positioning the blade in a substantially vertical orientation. The second step includes securing a blade reinforcement structure to the blade to reduce stress on a portion of the blade. Next, a damaged portion of the blade is removed, and a repair portion is installed to the blade where the damaged portion was removed. After the repairs have been made, the method concludes by removing the blade reinforcement structure from the blade.

In one particular embodiment, the step of securing a blade reinforcement structure to the blade further includes the step of securing a clamping structure to the blade. The step of securing a clamping structure includes securing a primary proximal clamp above a max chord location and securing a primary distal clamp below the max chord location, and further includes the step of interlocking the primary proximal clamp and the primary distal clamp with a clamp interlock structure. The clamp interlock structure may be utilized to apply a force to the primary proximal clamp and the primary distal clamp to reduce stress on a portion of the blade.

In another embodiment, the step of securing the blade reinforcement structure to the blade further includes the step of stabilizing the blade from the tower by securing a load transfer structure to the blade and the tower. The load transfer structure may include an adjustable blade-to-tower support having a blade attachment device, a longitudinally adjustable device, and a tower attachment device. The load transfer structure may be used to apply a force to the blade.

In yet another embodiment, the method further includes the step of suspending the blade reinforcement structure from a nacelle via a hoisting system. The hoisting system may include a sinistral cable, a dextral cable, a sinistral hoist, and a dextral hoist. Moreover, the method further includes the step of operating the sinistral hoist and the dextral hoist to raise or lower the blade reinforcement structure to the damaged portion of the blade.

These variations, modifications, alternatives, and alterations of the various preferred embodiments may be used alone or in combination with one another, as will become more readily apparent to those with skill in the art with reference to the following detailed description of the preferred embodiments and the accompanying figures and drawings.

BRIEF DESCRIPTION OF THE DRAWINGS

Without limiting the scope of the method as claimed below and referring now to the drawings and figures:

Figure 1:
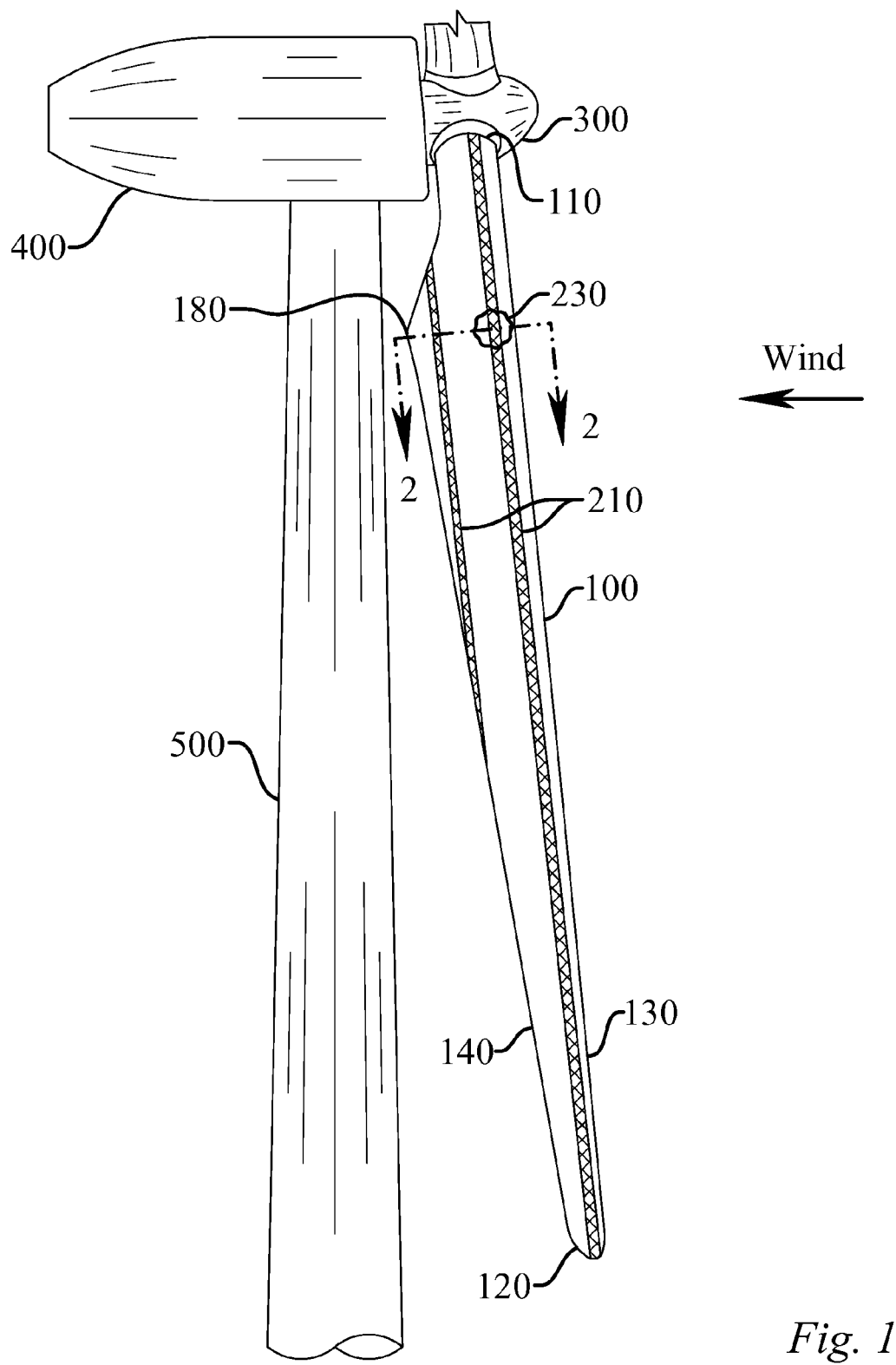
FIG. 1 is a side elevation view of a wind turbine blade, not to scale.

These drawings are provided to assist in the understanding of the exemplary embodiments of the various apparatus associated with the method as described in more detail below and should not be construed as unduly limiting the claimed method. In particular, the relative spacing, positioning, sizing and dimensions of the various elements illustrated in the drawings are not drawn to scale and may have been exaggerated, reduced or otherwise modified for the purpose of improved clarity. Those of ordinary skill in the art will also appreciate that a range of alternative configurations have been omitted simply to improve the clarity and reduce the number of drawings.

DETAILED DESCRIPTION OF THE INVENTION

The claimed method of repairing a wind turbine blade (100) enables a significant advance in the state of the art. The preferred embodiments of the apparatus associated with the method accomplish this by new and novel arrangements of elements that are configured in unique and novel ways and which demonstrate previously unavailable but preferred and desirable capabilities. The detailed description set forth below in connection with the drawings is intended merely as a description of the presently preferred embodiments of the method, and is not intended to represent the only form in which the method may be performed or implemented. The description sets forth the designs, functions, means, and apparatus for implementing the method in connection with the illustrated embodiments. It is to be understood, however, that the same or equivalent functions and features may be accomplished by different embodiments that are also intended to be encompassed within the spirit and scope of the claimed method.

Figure 2:
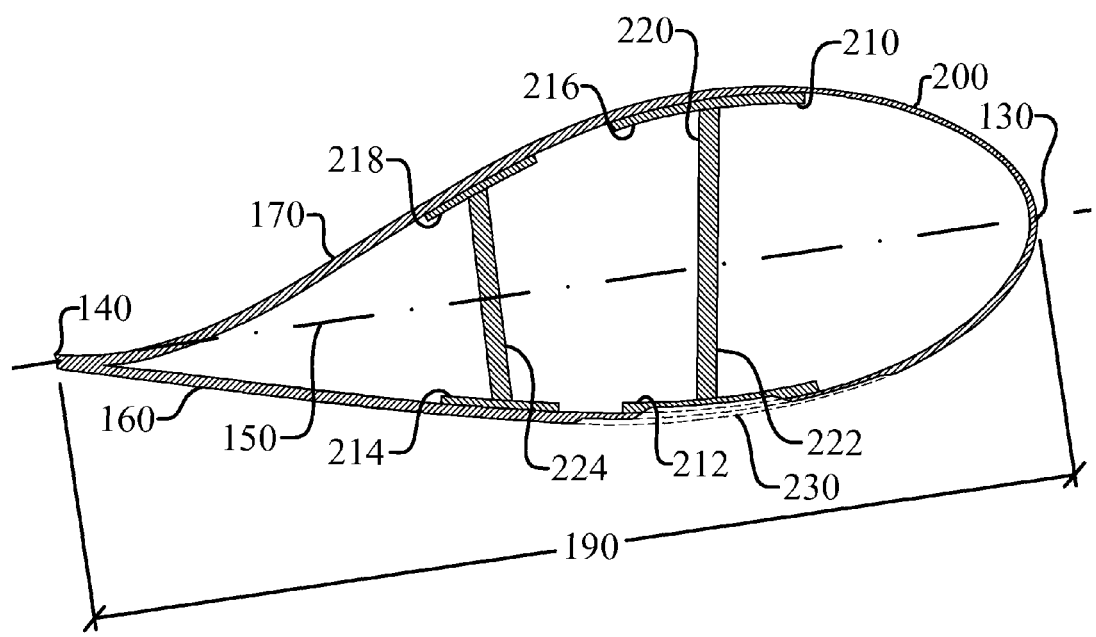
FIG. 2 is a cross-sectional view of the wind turbine blade taken along section line 2-2 of FIG. 1, not to scale.

With reference now to FIGS. 1 and 2, a conventional wind turbine for converting the kinetic energy of the wind into electrical energy is illustrated. Perhaps the most important components of a conventional wind turbine are the blades (100), which will be described in more detail below. The blades (100), of which there are typically three, are attached to a hub (300) that is connected to a nacelle (400). The nacelle (400) houses a drive train comprising connecting shafts, a gearbox, support bearings, a generator, and control equipment, along with other machinery. A tower (500), typically constructed of steel, is erected on a foundation and supports the nacelle (400), hub (300), and blades (100).

Still referring to FIGS. 1 and 2, the various portions and components of a typical wind turbine blade (100) will now be described. As seen in FIG. 1, the blade (100) has a root (110), which is joined to the hub (300), and a tip (120). The blade (100) also includes a leading edge (130), a trailing edge (140), and a leading-to-trailing edge axis (150), which may defined as an imaginary line extending between the forwardmost point of the leading edge (130) and the rearwardmost point of the trailing edge (140), as seen in FIG. 2. To help generate lift, the blade (100) has an aerodynamic profile with a suction side (160) and a pressure side (170). As seen in FIG. 1, the blade (100) has a max chord location (180) that corresponds to the widest portion of the blade (100), which defines the max chord distance (190), as seen in FIG. 2.

Generally, the blade (100) comprises a shell (200) that is typically formed of a glass fiber reinforced composite. The shell (200) may be generally hollow or contain a core material, such as balsa wood or PVC foam; however, those with skill in the art will recognize that other materials may be used to form the shell (200). In order to provide the blade (100) with increased structural reinforcement, the shell (200) typically includes a spar cap (210) and a shear web (220). As seen in FIG. 2, the blade (100) may have a primary suction side spar cap (212) connected to a primary pressure side spar cap (216) by a primary shear web (220). Similarly, the blade (100) may have a secondary suction side spar cap (214) connected to a secondary pressure side spar cap (218) by a secondary shear web (224). Spar caps (210) have typically been constructed from glass fiber reinforced composites; however, spar caps (210) made of stronger materials, such as carbon fiber reinforced composites and other advanced materials, are also available.

Referring again to FIGS. 1 and 2, it can be seen that the blade (100) has a damaged portion (230). The damaged portion (230) may result from a number of causes, such as a lightning strike, a bird strike, or fatigue, just to name a few. A wind turbine operating with damaged blades (100) will inevitably decrease the wind turbine's operating efficiency. Thus, when a damaged portion (230) is discovered on a blade (100) it is imperative to repair the blade (100) in order to prevent further damage and to improve the wind turbine's efficiency.

As opposed to prior methods for repairing a wind turbine blade (100), the presently disclosed method of repairing a wind turbine blade (100) does not require removing the blade (100) from the tower (500). In one embodiment, the first step of the method includes positioning the blade (100) in a substantially vertical orientation. The second step includes securing a blade reinforcement structure (600) to the blade (100) to reduce stress on a portion of the blade (100). Next, a damaged portion (230) of the blade (100) is removed. Further, a repair portion (240) is installed to the blade (100) where the damaged portion (230) was removed. And finally, the blade reinforcement structure (600) is removed from the blade (100). Now, the steps of the method, as well as embodiments of the apparatus for carrying out the method, will be described in greater detail.

As previously mentioned, the method begins by positioning a blade (100) that is to be repaired in a substantially vertical orientation. What is meant by a substantially vertical orientation is that the root (110) and the tip (120) of the blade (100) point directly toward the ground along an imaginary vertical plane. A typical wind turbine will have control equipment that allows an operator to position the blade (100) by rotating the blade (100) to the desired orientation and then locking the blade (100) in that orientation. In addition, the wind turbine may also include control equipment that allows an operator to adjust the pitch of the blade (100) to position the blade (100) so that the leading-to-trailing edge axis (150) has a particular orientation to a wind direction. In a particular embodiment, the method may further include the step of positioning the blade (100) so that the leading-to-trailing edge axis (150) is substantially parallel to a wind direction. Such positioning can help reduce stresses on the suction side (160) and pressure side (170) of the blade (100) caused by the wind when making repairs.

When repairing a portion of a blade (100) it is important to reduce the stress at the point of the repair as much as possible. Obviously, if the blade (100) is bending due to wind loads then portions of the shell (200) will have compressive stress and portions will have tensile stress. If the portion of the blade (100) being repaired is under high stress while the repairs are made, then any such repairs will be structurally compromised and subject to early failure. Moreover, making repairs to a portion of the blade (100) that is under considerable stress substantially increases the risk that the blade (100) profile will be compromised, which can substantially lower the operating efficiency of the wind turbine or cause blade failure. This becomes even more important when the damaged portion (230) includes at least a portion of a spar cap (210) of the blade (100), which is the primary structural support for the blade (100). Currently, when the damaged portion (230) includes a portion of a spar cap (210), the blade (100) is removed from the hub (300) to carry out repairs to ensure that the profile of the blade (100) is not altered.

Figure 3:
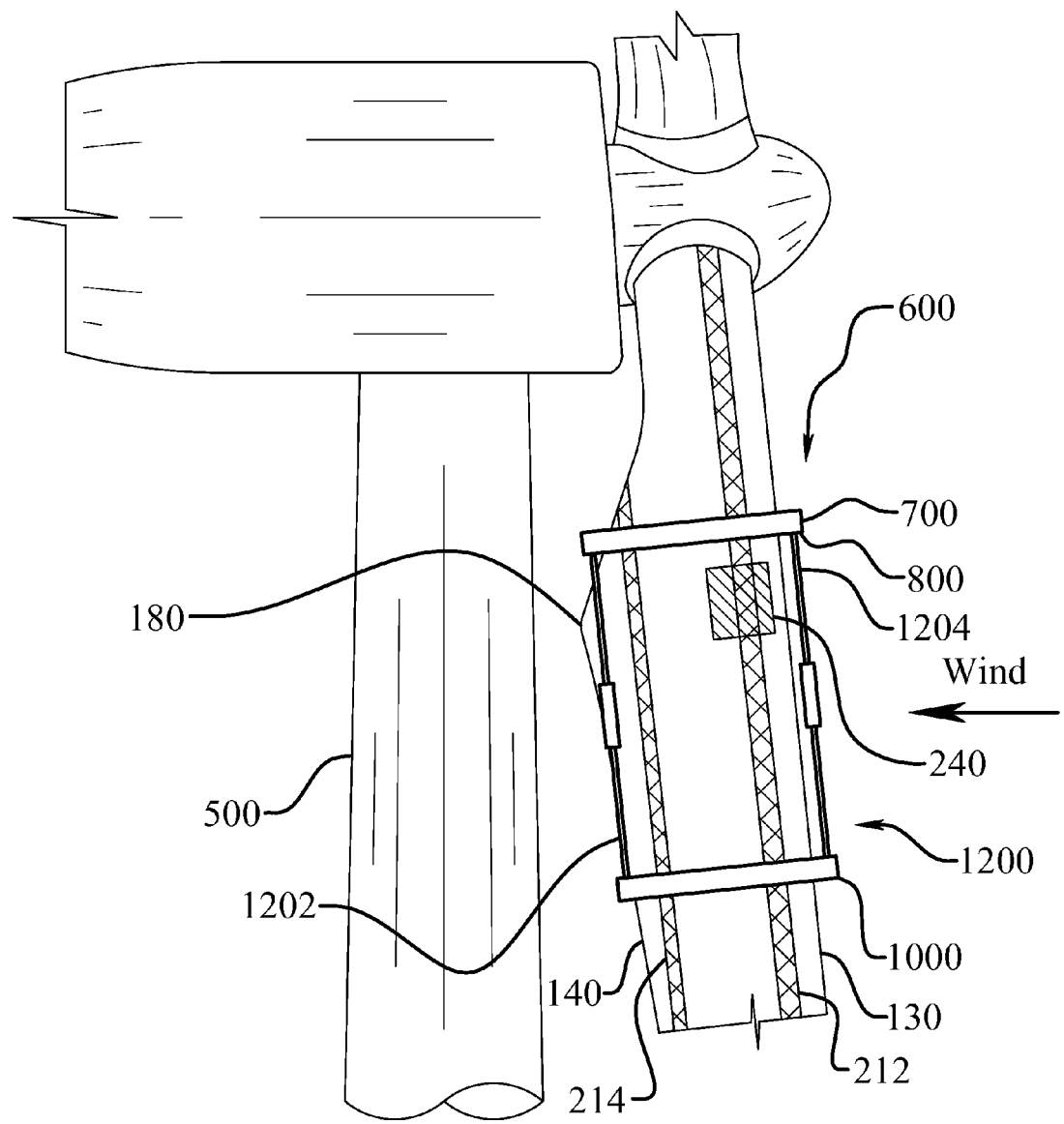
FIG. 3 shows an embodiment of a blade reinforcement structure secured to the wind turbine blade, not to scale.

As such, an additional step in an embodiment of the method includes securing a blade reinforcement structure (600) to the blade (100) to reduce stress on a portion of the blade (100). In one particular embodiment, the blade reinforcement structure (600) may include a clamping structure (700) having a primary proximal clamp (800) connected to a primary distal clamp (1000) by a clamp interlock structure (1200), as seen in FIG. 3. Thus, the step of securing a blade reinforcement structure (600) to the blade (100) may further include the step of securing the clamping structure (700) to the blade (100), which may include the step of securing the primary proximal clamp (800) above a max chord location (180) and securing a primary distal clamp (1000) below the max chord location (180). However, one with skill in the art will recognize that the primary proximal clamp (800) and the primary distal clamp (1000) may be successfully secured along any portion of the blade (100). The step of securing a blade reinforcement structure (600) to the blade (100) may further include the step of interlocking the primary proximal clamp (800) and the primary distal clamp (1000) with a clamp interlock structure (1200). Additionally, the primary proximal clamp (800) and the primary distal clamp (1000) may be positioned such that the damaged portion (230) of the blade (100) to be repaired is located between the primary proximal clamp (800) and the primary distal clamp (1000) to help reinforce and reduce stresses on the damaged portion (230) of the blade (100).

Figure 17:
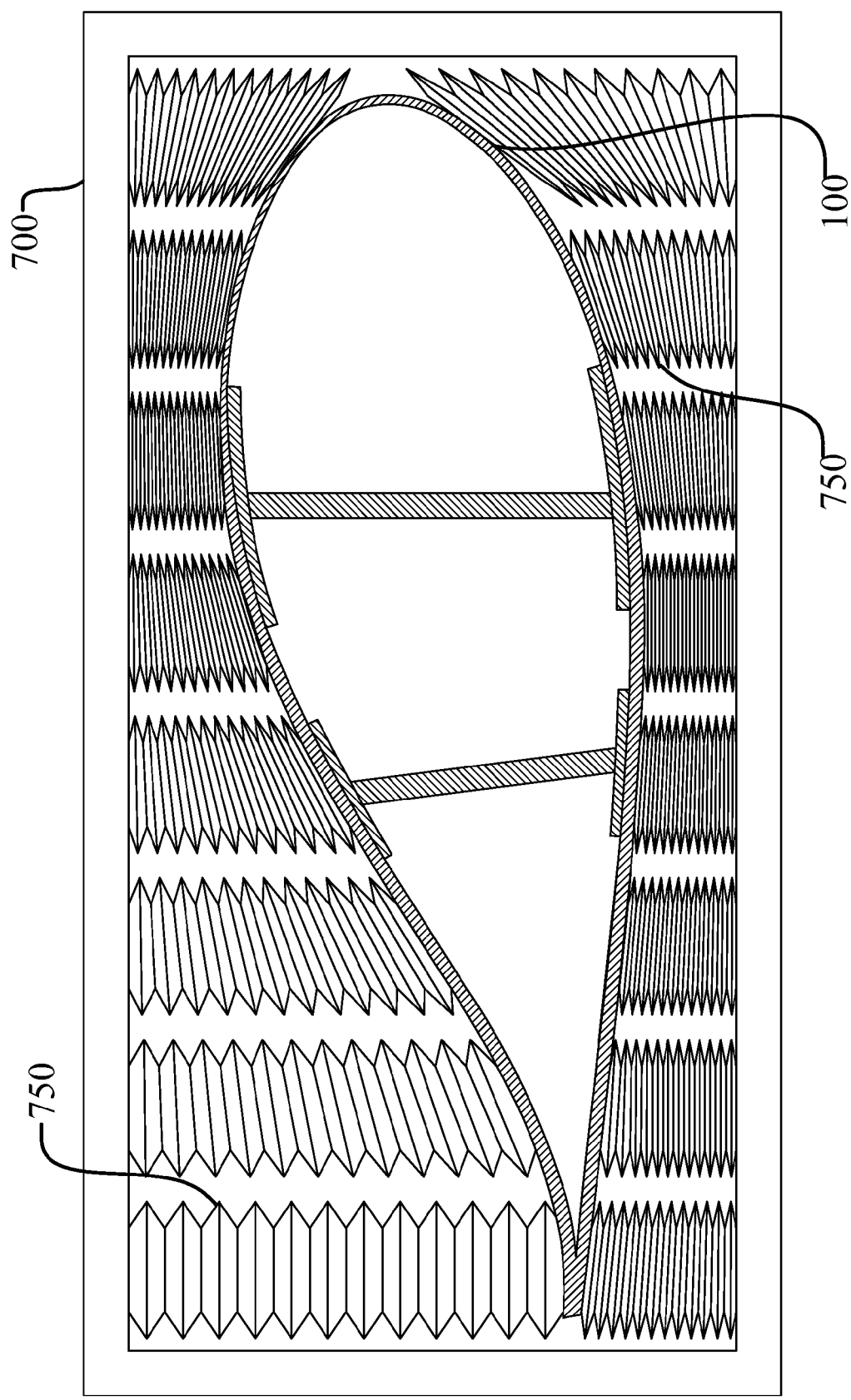
FIG. 17 shows a cross-sectional view of a wind turbine blade with an embodiment of a clamping structure secured thereto, not to scale.

As one with skill in the art will appreciate, the clamping structure (700), including the primary proximal clamp (800) and the primary distal clamp (1000), should be configured to closely follow the contour of the blade (100) to ensure a secure fit. As such, the clamping structure (700) may include molded portions so that the clamping structure (700) conforms to the particular contours of the blade (100). Alternatively, the clamping structure (700) may comprise straps that may be cinched to apply a clamping force to the blade (100). The straps may contain projecting contact surfaces to account for the contour of the blade (100). Moreover, the clamping structure (700), including the primary proximal clamp (800) and the primary distal clamp (1000), may comprise a frame type structure for surrounding the blade (100) that includes biased reinforcements that apply a force on the blade (100). For example, and as seen in FIG. 17, the clamping structure (700) may include at least one inflatable bladder (750). In this embodiment, when the clamping structure (700) is in the desired position, the inflatable bladder (750) is filled with air to provide a clamping effect on the blade (100). Generally, the inflatable bladder (750) comprises a durable fabric material, such as Kevlar, nylon or polyurethane, that covers an inflatable rubber core so that the inflatable bladder (750) is capable of conforming to the general contour of the blade (100).

Figure 18:
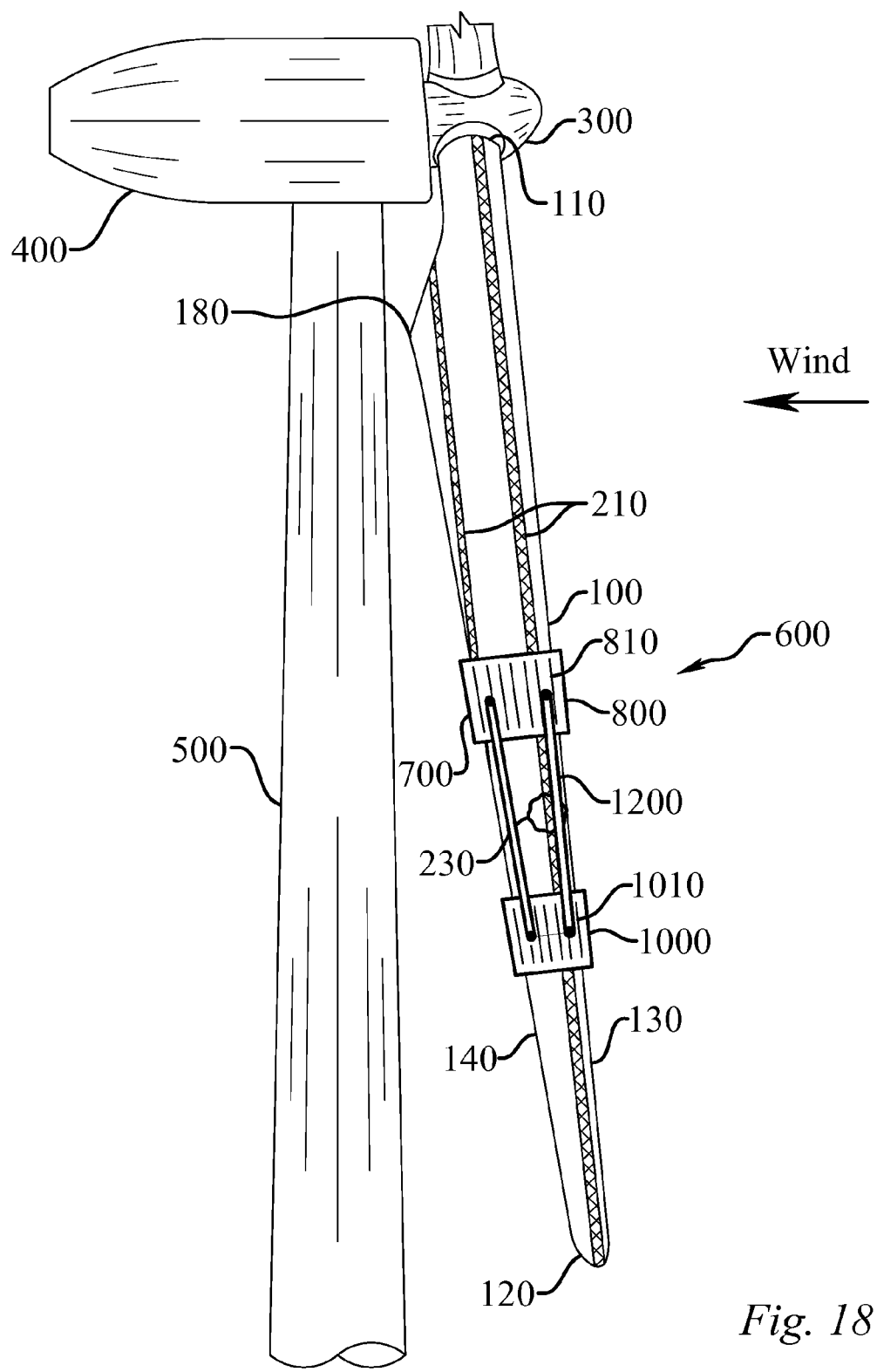
FIG. 18 shows an embodiment of a blade reinforcement structure secured to the wind turbine blade, not to scale.

In still another embodiment, the clamping structure (700), including the primary proximal clamp (800) and the primary distal clamp (1000), may comprise reinforced vacuum blankets, as seen in FIG. 18. The reinforced vacuum blanket type clamps (800, 1000) may generally comprise a flexible and durable material, such as Kevlar. As seen in FIG. 18, reinforced vacuum blanket type clamps (800, 1000) are configured to completely encircle the blade (100) and may be joined to one another via a clamp interlock structure (1200). To that end, the reinforced vacuum blanket type clamps (800, 1000) may be configured as tubes or as planar sheets of material that are joined at their ends. A number of reinforcement devices (810, 1010) may be fixedly attached to the material. The reinforcement devices (810, 1010) may be structural devices that are generally longer than they are wide and may be comprised of metal or high strength plastic. In this particular embodiment, the clamping force is applied by connecting the reinforced vacuum blanket type clamps (800, 1000) to a vacuum source, which creates a vacuum such that the clamps (800, 1000) are drawn into contact with the blade (100). The reinforced vacuum blanket type clamps (800, 1000) may be configured such that a vacuum is created to evacuate the air from the void between the material and the blade (100), thereby drawing the material and the reinforcement devices (810, 1010) into intimate contact with the blade (100), or the vacuum may draw the reinforcement devices (810, 1010) into contact with the blade (100), with the material following by default. Adjacent reinforcement devices (810, 1010) may be connected to each other by only the material, or they may be more rigidly attached to one another while still accommodating movement between them to facilitate use on the wide array of blade sizes and profiles. The reinforced vacuum blanket type clamps (800, 1000) preferably include an attachment nozzle to facilitate connection to a vacuum source.

One with skill in the art will also appreciate that the clamping structure (700) should be sized and configured in such a way that the clamping force and other loads exerted on the clamping structure (700) are distributed evenly and across a large enough area of the blade (100) so that the chances of damaging the blade (100) are minimized.

Figure 4:
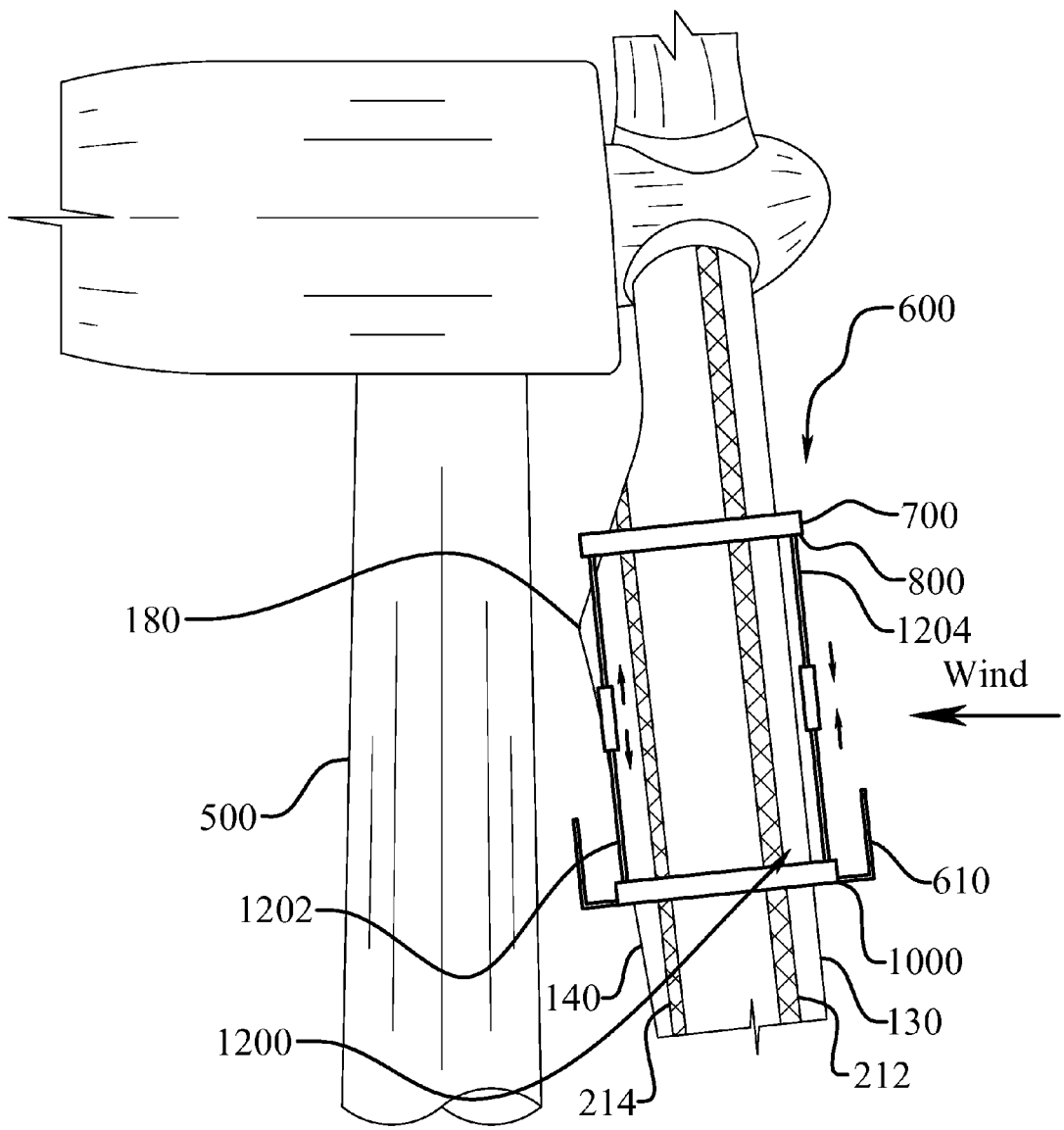
FIG. 4 shows an embodiment of a blade reinforcement structure having a reinforcement structure work platform secured to the wind turbine blade, not to scale.

With reference to FIGS. 3 and 4, and as mentioned above, the primary proximal clamp (800) and the primary distal clamp (1000) are interlocked to one another with a clamp interlock structure (1200). The clamp interlock structure (1200) may be a single structure or include multiple structures such as a compressive side interlock structure (1202), a tensile side interlock structure (1204), or both, as explained below.

In one particular embodiment, the clamp interlock structure (1200) includes at least a compressive side interlock structure (1202), and the method further includes the step of applying force to the primary proximal clamp (800) and the primary distal clamp (1000) with the compressive side interlock structure (1202), thereby reducing stress on a portion of the blade (100) located between the primary proximal clamp (800) and the primary distal clamp (1000). As seen in FIG. 4, the compressive side interlock structure (1202) is positioned near where the blade (100) is experiencing compressive forces caused by the wind, which in this particular case happens to be on the trailing edge (140) side of the blade (100). The compressive side interlock structure (1202) is configured to exert force on the primary proximal and primary distal clamps (800, 1000) at a particular location on the clamps (800, 1000) to counteract the compressive forces to reduce the stress on the blade (100), as noted by the force arrows in FIG. 4. As one skilled in the art will appreciate, the compressive side interlock structure (1202) may apply force to the primary proximal and primary distal clamps (800, 1000) by utilizing, for example, a mechanical actuator, a hydraulic actuator, or a pneumatic actuator, just to name a few.

In another embodiment, the clamp interlock structure (1200) alternatively includes at least a tensile side interlock structure (1204), and the method further includes the step of applying force to the primary proximal clamp (800) and the primary distal clamp (1000) with the tensile side interlock structure (1204), thereby reducing stress on a portion of the blade (100) located between the primary proximal clamp (800) and the primary distal clamp (1000). As seen in FIG. 4, the tensile side interlock structure (1204) is positioned near where the blade (100) is experiencing tensile forces caused by the wind, which in this particular case happens to be the leading edge (130) side of the blade (100). The tensile side interlock structure (1204) is configured to exert force on the primary proximal and primary distal clamps (800, 1000) to counteract the tensile forces to reduce the stress on the blade (100), as noted by the force arrows in FIG. 4. As one skilled in the art will appreciate, the tensile side interlock structure (1204) may apply force to the primary proximal and primary distal clamps (800, 1000) by utilizing, for example, a mechanical actuator, a hydraulic actuator, or a pneumatic actuator, just to name a few.

In yet another embodiment, the clamp interlock structure (1200) includes at least a compressive side interlock structure (1202) and a tensile side interlock structure (1204), and the method further includes the step of applying force to the primary proximal and primary distal clamps (800, 1000) with the compressive side interlock structure (1202) and the tensile side interlock structure (1204), thereby reducing stress on a portion of the blade (100) located between the primary proximal and primary distal clamps (800, 1000). As seen in FIG. 4, and as mentioned above, the compressive side interlock structure (1202) is positioned near where the blade (100) is experiencing compressive forces caused by the wind, which in this particular case happens to be the trailing edge (140) side of the blade (100), and the tensile side interlock structure (1204) is positioned near where the blade (100) is experiencing tensile forces caused by the wind, which in this particular case happens to be the leading edge (130) side of the blade (100). In this particular embodiment, the compressive and tensile side interlock structures (1202, 1204) apply force to the primary proximal and primary distal clamps (800, 1000) to counteract the compressive forces and the tensile forces, respectively, to help reduce the stress on the blade (100), as noted by the force arrows in FIG. 4. As previously mentioned, one skilled in the art will appreciate that the compressive and tensile side interlock structures (1202, 1204) may utilize, by way of example only and not limitation, a mechanical actuator, a hydraulic actuator, or a pneumatic actuator to apply force to the primary proximal and primary distal clamps (800, 1000).

Figure 5:
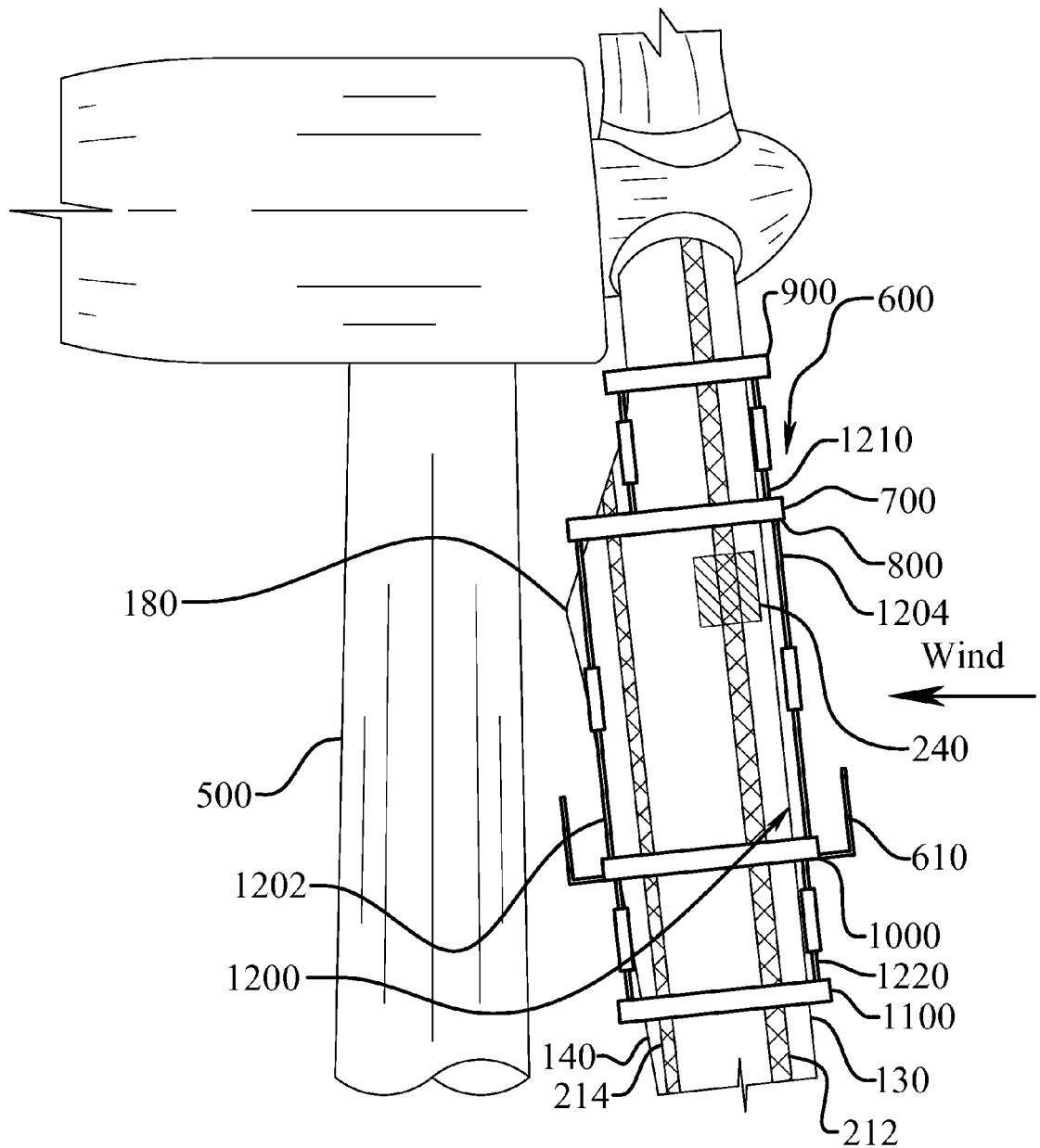
FIG. 5 shows an embodiment of a blade reinforcement structure secured to the wind turbine blade, not to scale.

Referring now to FIG. 5, an additional embodiment of the blade reinforcement structure (600) is shown. In this particular embodiment, the blade reinforcement structure (600) further includes a secondary proximal clamp (900) secured to the blade (100) above the primary proximal clamp (800) and a secondary distal clamp (1100) secured to the blade (100) below the primary distal clamp (1000). As seen in FIG. 5, the primary proximal clamp (800) and the secondary proximal clamp (900) are interlocked to one another with a secondary proximal clamp interlock structure (1210), while the primary distal clamp (1000) and the secondary distal clamp (1100) are interlocked to one another with a secondary distal clamp interlock structure (1220). The secondary proximal and distal clamps (900, 1100) are preferably sized and configured in accordance with the principles corresponding to the primary proximal and distal clamps (800, 1000), as previously discussed. Moreover, the secondary proximal and distal clamp interlock structures (1210, 1220) are preferably designed and capable of functioning in the same manner as the embodiments of the clamp interlock structure (1200) discussed above. Thus, the step of securing a blade reinforcement structure (600) to the blade (100) may further include the steps of securing a secondary proximal clamp (900) above the primary proximal clamp (800) and securing a secondary distal clamp (1100) below the primary distal clamp (1000). In addition, the step of securing a blade reinforcement structure (600) to the blade (100) may further include the steps of interlocking the primary proximal clamp (800) and the secondary proximal clamp (900) with a secondary proximal clamp interlock structure (1210) and interlocking the primary distal clamp (1000) and the secondary distal clamp (1100) with a secondary distal clamp interlock structure (1220).

Figure 6:
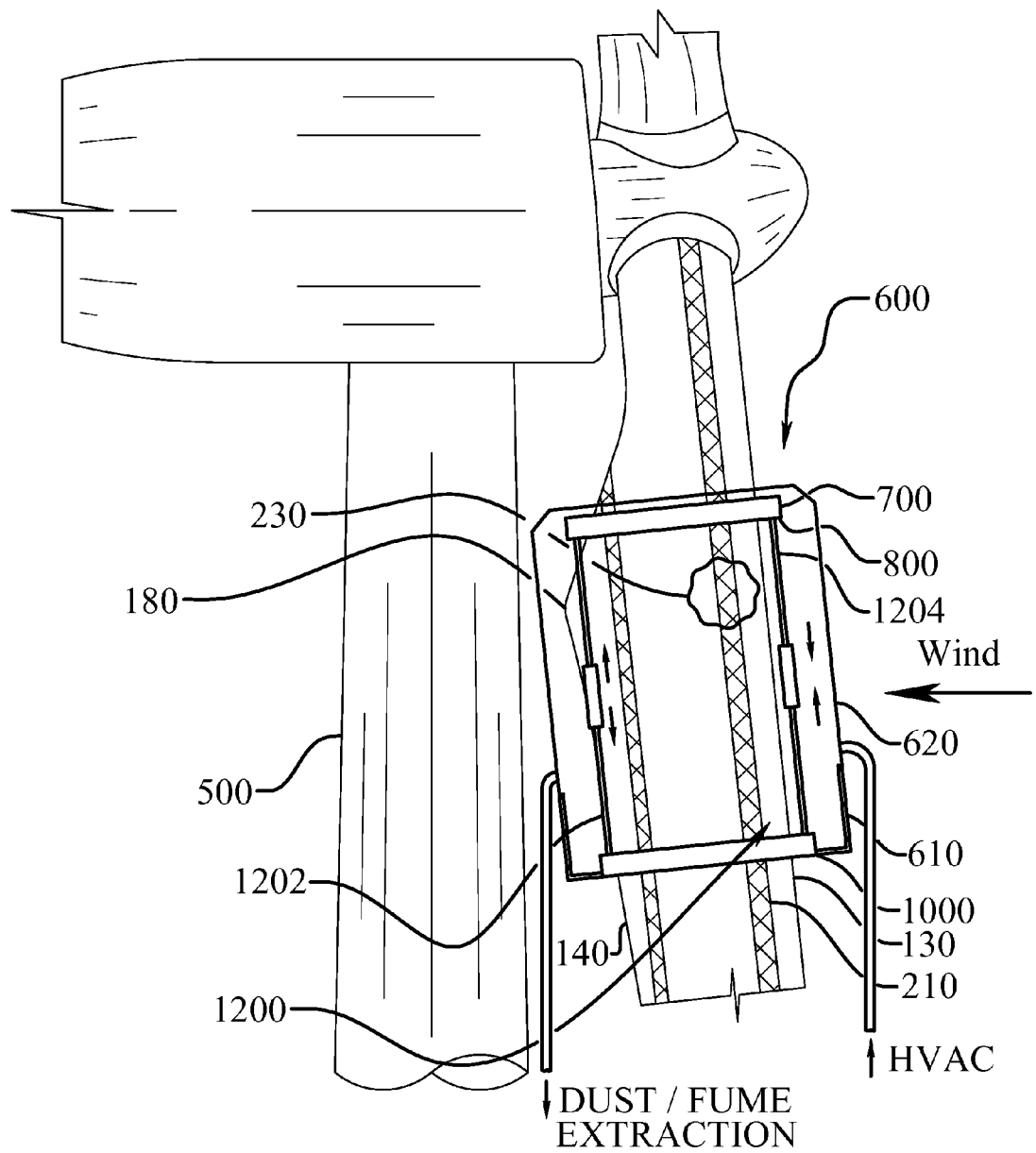
FIG. 6 shows an embodiment of a blade reinforcement structure and an embodiment of a containment structure secured to the wind turbine blade, not to scale.

With reference now to FIGS. 4-6, in one embodiment, the blade reinforcement structure (600) may include a reinforcement structure work platform (610). As seen in FIGS. 4-6, the reinforcement structure work platform (610) is secured to the blade reinforcement structure (600) at the primary distal clamp (1000); however, one with skill in the art will recognize that the reinforcement structure work platform (610) may be secured to any portion of the blade reinforcement structure (600). Thus, the step of securing a blade reinforcement structure (600) to the blade (100) may further include the step of securing a reinforcement work platform (610) to the blade reinforcement structure (600). The reinforcement structure work platform (610) provides a surface from which a worker may access the blade (100) and make repairs to a damaged portion (230) of the blade (100). The reinforcement structure work platform (610) may partially surround the blade (100), as seen in FIGS. 4-6, or may totally surround the blade (100). Preferably, the reinforcement structure work platform (610) includes a railing to provide fall protection.

As previously mentioned, the primary proximal clamp (800) may be secured above the max chord location (180), as seen in FIG. 3. In a particular embodiment, the primary proximal clamp (800) is configured such that the secured primary proximal clamp (800) cannot pass the max chord location (180). For example, the primary proximal clamp (800) may have a width that is less than the max chord distance (190). Such an embodiment ensures that the clamping structure (700) will not slide off the blade (100) should the primary proximal clamp (800) disengage the blade (100).

Figure 10:
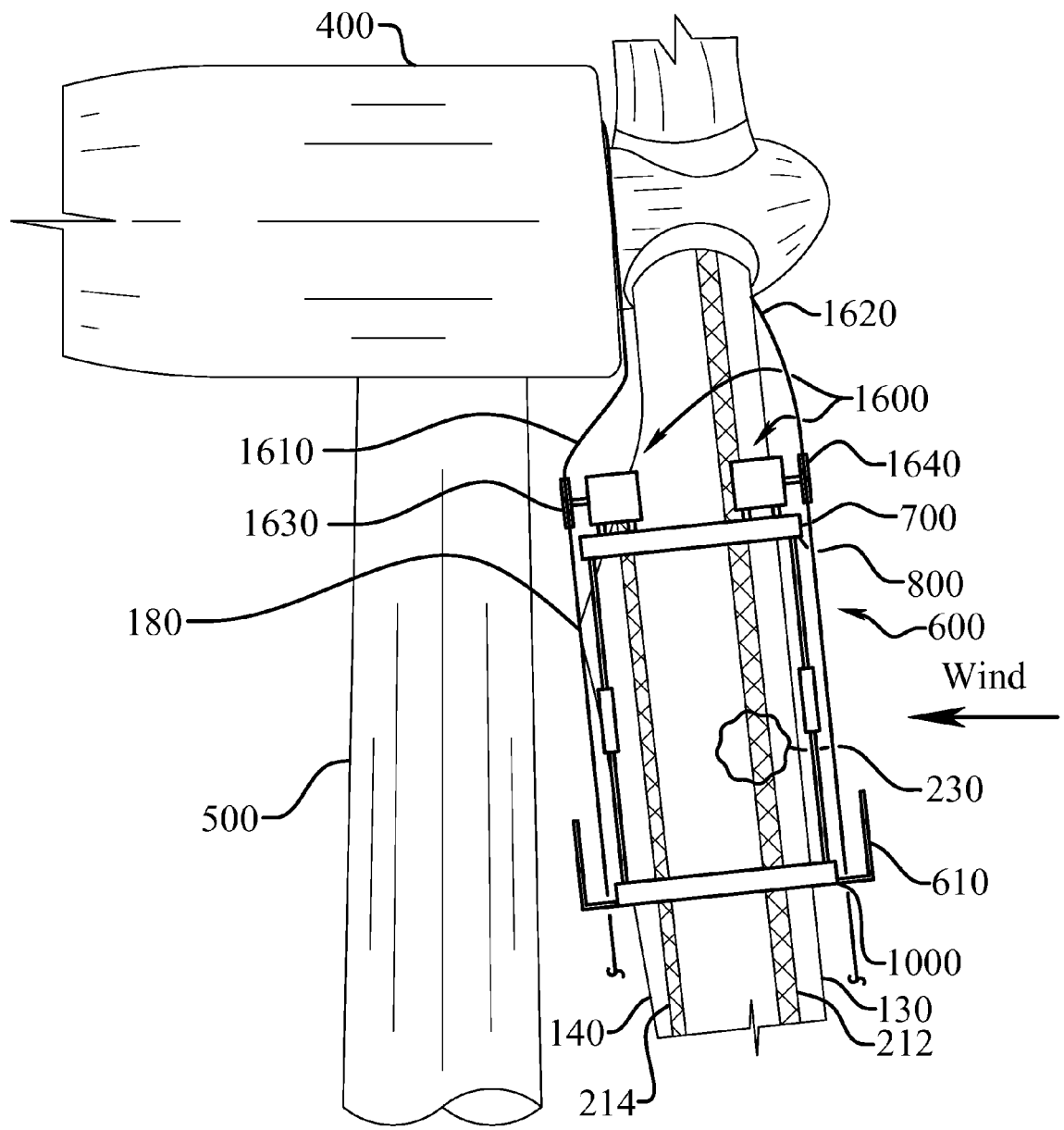
FIG. 10 shows an embodiment of a blade reinforcement structure secured to the wind turbine blade and suspended by a hoisting system, not to scale.

The blade reinforcement structure (600) may be lifted by a crane and manually secured to the blade (100) by workers suspended from the hub (300) or nacelle (400). Alternatively, and now referring to FIG. 10, the blade reinforcement structure (600) may be suspended from the nacelle (400), or alternatively the hub (300), by a hoisting system (1600). The hoisting system (1600) may include a sinistral cable (1610), a dextral cable (1620), a sinistral hoist (1630), and a dextral hoist (1640). The sinistral and dextral hoists (1630, 1640) may be drum hoists mounted to the nacelle (400) or the hub (300), or traction hoists mounted to the blade reinforcement structure (600) that are capable of ascending and descending along the sinistral and dextral cables (1610, 1620), as seen in FIG. 10. As with all conventional hoists, the sinistral and dextral hoists (1630, 1640) include controls to allow a user to operate the sinistral and dextral hoists (1630, 1640) to raise or lower the blade reinforcement structure (600) to a desired portion of the blade (100). Thus, in one particular embodiment of the method, the step of securing the blade reinforcement structure (600) to the blade (100) may further include the step of suspending the blade reinforcement structure (600) from the nacelle (400) via a hoisting system (1600) including a sinistral cable (1610), a dextral cable (1620), a sinistral hoist (1630), and a dextral hoist (1640), and further including the step of operating the sinistral hoist (1630) and the dextral hoist (1640) to raise or lower the blade reinforcement structure (600) to the damaged portion (230). After the blade reinforcement structure (600) is raised or lowered to the desired position it may be secured to the blade (100).

Figure 13:
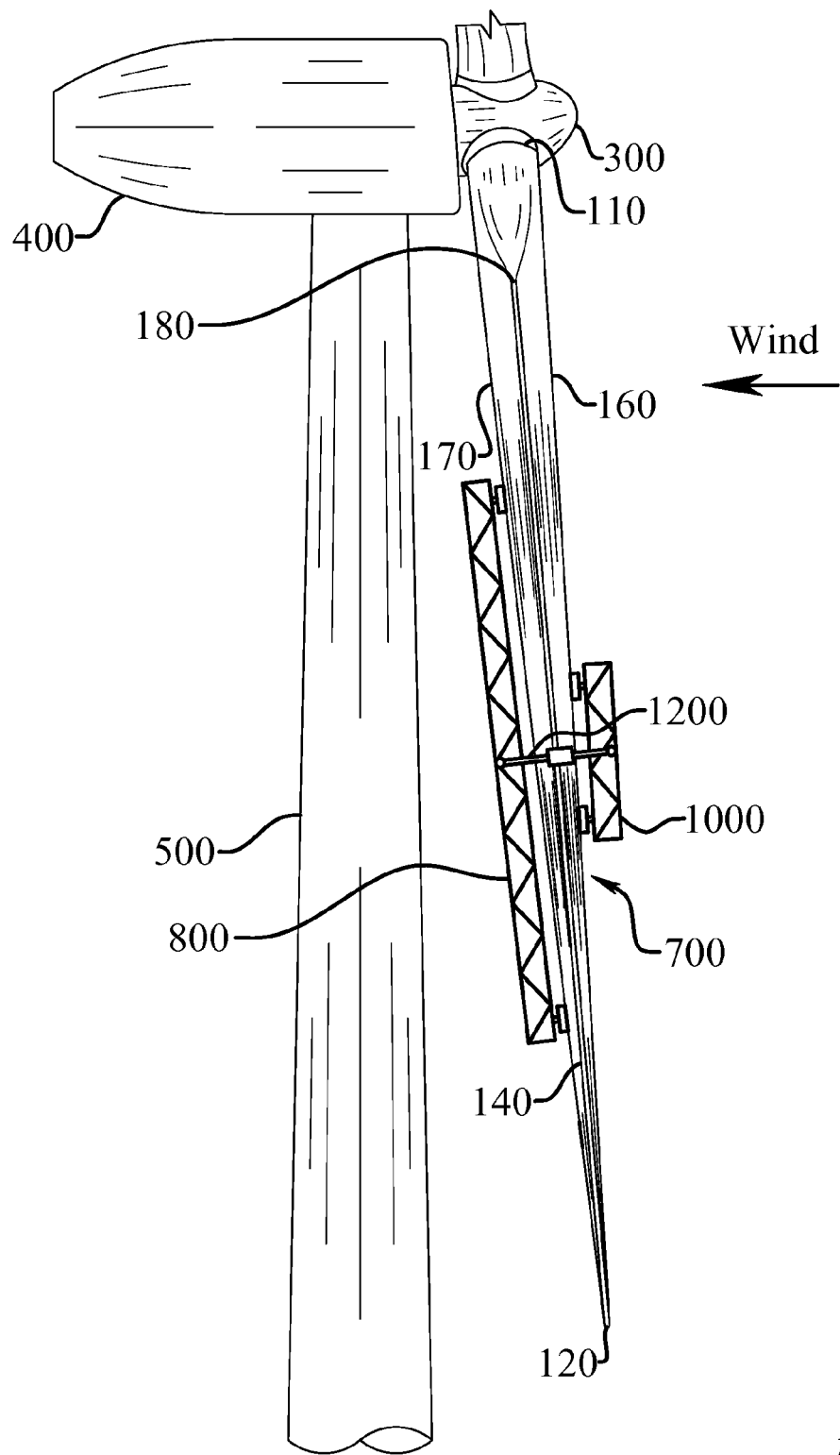
FIG. 13 shows an embodiment of a blade reinforcement structure secured to the wind turbine blade, not to scale.

With reference now to FIG. 13, an additional embodiment of the clamping structure (700) is shown in which the primary proximal clamp (800) and the primary distal clamp (1000) are positioned away from one another in a horizontal direction, rather than the previously disclosed vertical orientation. As seen in FIG. 13, the primary proximal clamp (800) and the primary distal clamp (1000) are formed with a truss-like structure. As discussed above, the portions of the clamping structure (700) that are in direct contact with the blade (100) may include molded portions to conform to the particular contours of the blade (100). Moreover, and as one with skill in the art will appreciate, the clamping structure (700) should be sized and configured in such a way that the clamping force and other loads exerted on the clamping structure (700) are distributed evenly and across a large enough area of the blade (100) so that the chances of damaging the blade (100) are minimized.

As shown in FIG. 13, the primary proximal clamp (800) and the primary distal clamp (1000) are interlocked to one another with a clamp interlock structure (1200). The clamp interlock structure (1200) is configured to exert force on the primary proximal and primary distal clamps (800, 1000) to counteract forces acting on the blade (100) to reduce the stress on the blade (100). As one skilled in the art will appreciate, the clamp interlock structure (1200) may apply force to the primary proximal and primary distal clamps (800, 1000) by utilizing, for example, a mechanical actuator, a hydraulic actuator, or a pneumatic actuator, just to name a few.

Figure 14:
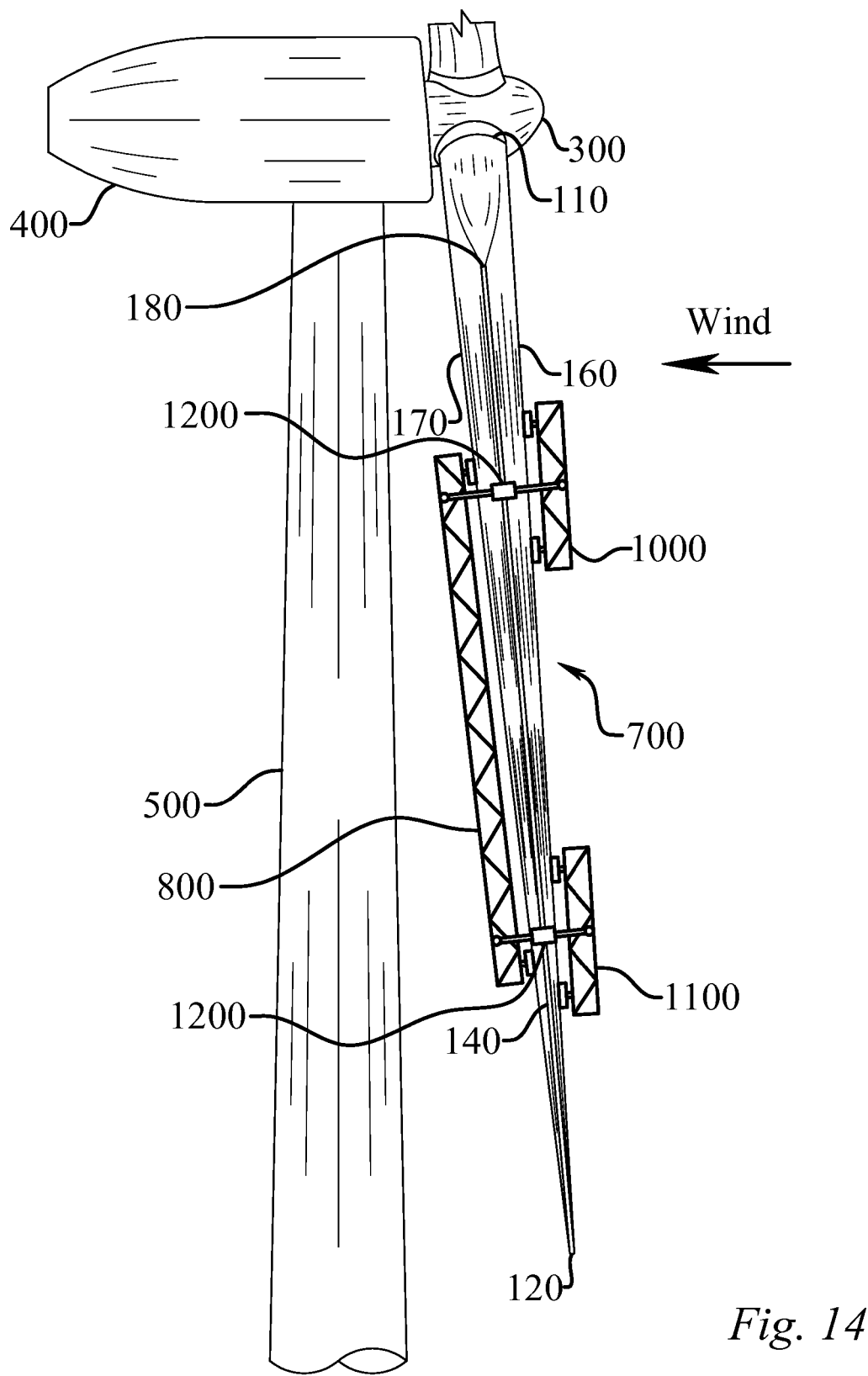
FIG. 14 shows an embodiment of a blade reinforcement structure secured to the wind turbine blade, not to scale.

Referring now to FIG. 14, another embodiment of the clamping structure (700) is illustrated. As seen in FIG. 14, the clamping structure (700) includes a primary proximal clamp (800), a primary distal clamp (1000), and a secondary distal clamp (1100). Similar to the previously discussed embodiment, the primary proximal clamp (800), the primary distal clamp (1000), and the secondary distal clamp (1100) are each formed with a truss-like structure. As previously discussed, the portions of the clamping structure (700) that are in direct contact with the blade (100) may include molded portions to conform to the particular contours of the blade (100) to ensure a secure fit. By utilizing a secondary distal clamp (1100), this particular embodiment of the clamping structure (700) helps to ensure that the clamping force and other loads exerted on the clamping structure (700) are distributed more evenly and across a larger area of the blade (100) to reduce the chances of damaging the blade (100).

In this embodiment the orientation of the hub (300) and the position of the blades (100) are selected for ease of reducing the stress in the vicinity of the damaged portion (230). In this embodiment it is easier to apply stress reducing loads to the blade (100) on the suction side (160) and pressure side (170), rather than the leading edge (130) or trailing edge (140). Thus, the pitch of the blade (100) is selected depending on the location of the damaged portion (230) so that stress reducing loads may be applied to the suction side (160) and pressure side (170) to achieve significant stress reduction in the vicinity of the damaged portion (230).

For example, in FIG. 13 the damaged portion (230) is located on the suction side (160) or the pressure side (170) such that positioning the pitch of the blade (100) so the leading-to-trailing edge axis (150) is roughly perpendicular to the direction of the wind allows the primary proximal clamp (800) and the primary distal clamp (1000) to be positioned such that the clamp interlock structure (1200) can simply reduce the stress in the vicinity of the damaged portion (230). In this example, the wind causes the blade (100) to bend such that the blade tip (120) deflects toward the tower (500). Thus, assuming the damaged portion (230) is somewhere near the illustrated position of where the clamp interlock structure (1200), primary proximal clamp (800) and the primary distal clamp (1000) are positioned, and are in contact with the blade (100), the clamp interlock structure (1200) may draw the clamps (800, 1000) toward each other thereby reducing the bend of the blade (100) and thereby reducing the stress in the vicinity of the damaged portion (230).

One with skill in the art will appreciate that depending on the location of the damaged portion (230) on the blade (100) in the leading edge (130) to trailing edge (140) direction, the pitch of the blade can be adjusted to reduce the stress in the vicinity of the damaged portion (230) when force is applied to the clamps (800, 1000) in a direction that is largely orthogonal to the leading-to-trailing edge axis (150). Further, although the side elevation views of FIGS. 13 and 14 only illustrate one pair of "contacting feet" on each clamp (800, 1000), there may be multiple "contacting feet" positioned in the direction of the leading-to-trailing edge axis (150) to aid in distributing the load applied by the clamp interlock structure (1200) to focus where the desired stress reduction is achieved while accounting for the complex shape of the blade (100).

Still referring to FIG. 14, it can be seen that the primary proximal clamp (800) is interlocked to both the primary distal clamp (1000) and the secondary distal clamp (1100) with clamp interlock structures (1200). Each clamp interlock structure (1200) is configured to exert force on the primary proximal clamp (800), primary distal clamp (1000), and the secondary distal clamp (1100) to counteract forces acting on the blade (100) to reduce the stress on the blade (100). As one skilled in the art will appreciate, the clamp interlock structure (1200) may apply force to the primary proximal clamp (800), primary distal clamp (1000), and the secondary distal clamp (1100) by utilizing, for example, a mechanical actuator, a hydraulic actuator, or a pneumatic actuator, just to name a few.

In an alternative embodiment, the step of securing the blade reinforcement structure (600) to the blade (100) may further include the step of stabilizing the blade (100) from the tower (500), as seen in FIGS. 7, 8, 11, 12 and 15. The step of stabilizing the blade (100) from the tower (500) serves to counteract forces on the blade (100) and reduce stress in the vicinity of a damaged portion (230). As previously mentioned, making repairs to the damaged portion (230) of the blade (100) under stress may structurally compromise the repair portion (240), and moreover, may compromise the blade (100) profile, which can substantially lower the operating efficiency of the wind turbine.

Figure 7:
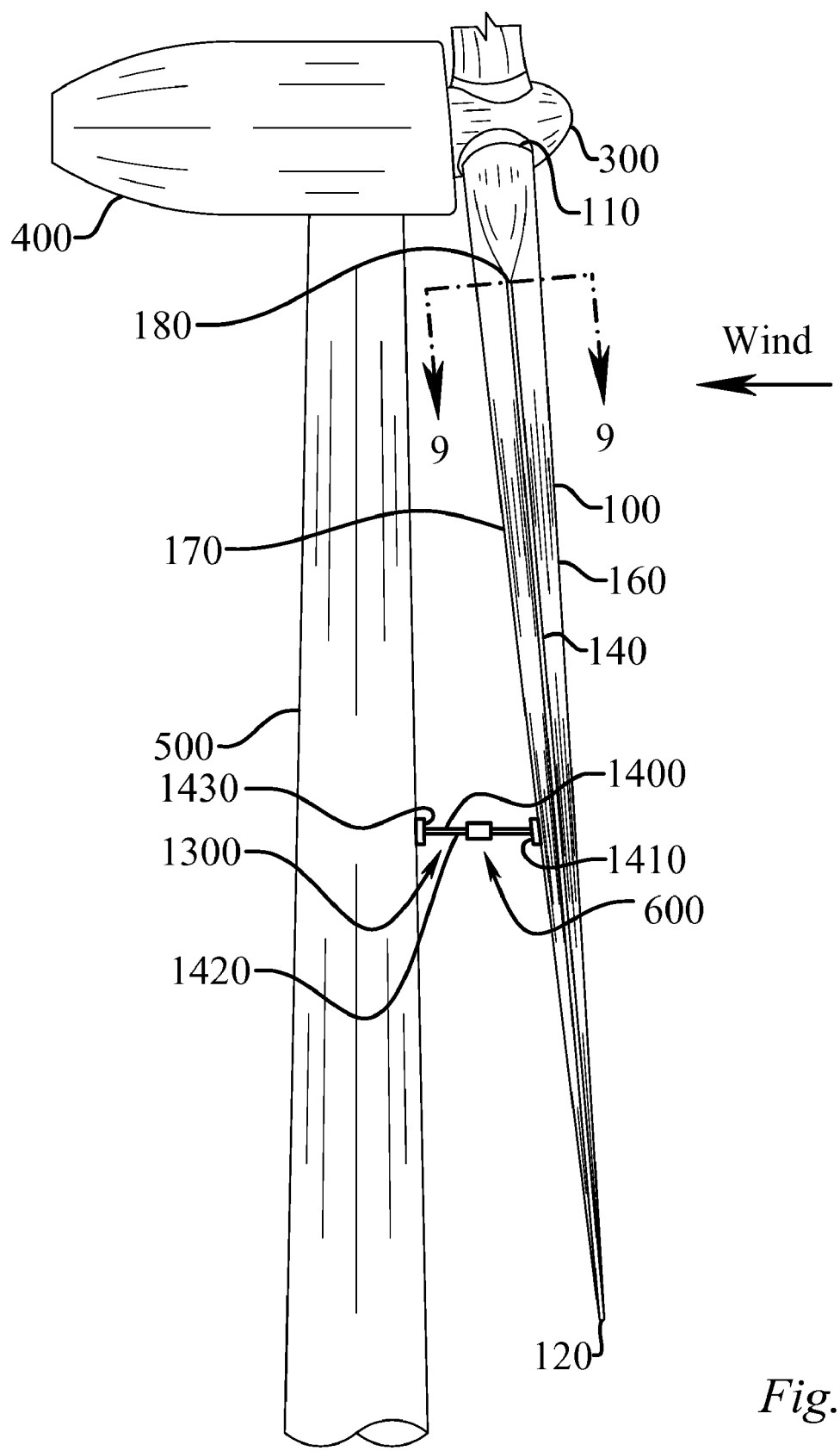
FIG. 7 shows an embodiment of a blade reinforcement structure secured to the wind turbine blade, not to scale.

In one particular embodiment seen in FIG. 7, the blade reinforcement structure (600) comprises a load transfer structure (1300) including an adjustable blade-to-tower support (1400) having a blade attachment device (1410), a longitudinally adjustable device (1420), and a tower attachment device (1430). Thus, the step of stabilizing the blade (100) from the tower (500) may be accomplished by securing a load transfer structure (1300) to the blade (100) and the tower (500). Moreover, the step of stabilizing the blade (100) from the tower (500) may further include the step of applying a force to the blade (100) with the load transfer structure (1300). Preferably, the load transfer structure (1300) is secured to the blade (100) below the damaged portion (230).

The adjustable blade-to-tower support (1400) may be any device capable of applying a force towards the blade (100), towards the tower (500), or towards both the blade (100) and tower (500). This force may be created by the longitudinally adjustable device (1420), for example, by extending the blade attachment device (1410) towards the blade (100), extending the tower attachment device (1430) towards the tower (500), or both. As such, the longitudinally adjustable device (1420) may be a mechanical actuator, a hydraulic actuator, or a pneumatic actuator, just to name a few.

As one with skill in the art will appreciate, the blade attachment device (1410) should be configured to closely follow the contour of the blade (100) to help distribute the load more evenly across a larger area of the blade (100). Similarly, the tower attachment device (1430) should be configured to closely follow the contour of the tower (500) to help distribute the load more evenly across a larger area of the tower (500). Thus, the blade attachment device (1410) may include a molded portion to conform to the particular contours of the blade (100), and the tower attachment device (1430) may include a molded portion to conform to the particular contours of the tower (500).

Figure 9:
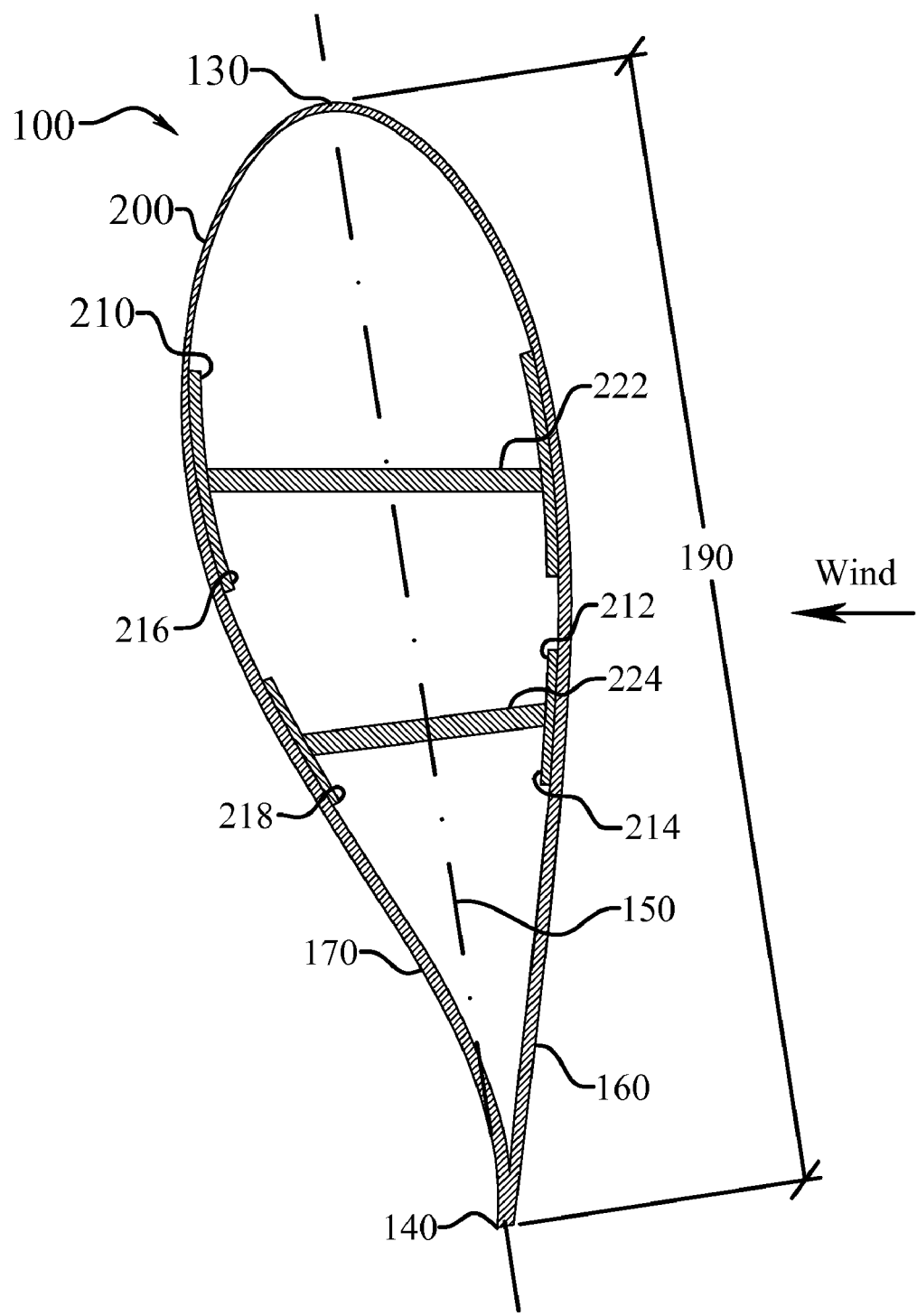
FIG. 9 is a cross-sectional view of the wind turbine blade taken along section line 9-9 of FIG. 7, not to scale.

With reference now to FIGS. 7 and 9, one will observe that the leading edge (130) of the blade (100) has been rotated such that it is no longer directly facing the wind direction. As mentioned above, conventional wind turbines typically include control equipment that allows an operator to adjust the pitch of the blade (100) to position the blade (100) so that the leading-to-trailing edge axis (150) has a particular orientation to a wind direction. This is particularly advantageous when securing the load transfer structure (1300) to the blade (100) and the tower (500). The advantage lies in the fact that the blade attachment device (1410) may be attached to the suction or pressure sides (160, 170) of the blade (100) instead of the leading and trailing edges (130, 140) of the blade (100). The suction and pressure sides (160, 170) of the blade (100) provide much more surface area, and thus the loads and stresses where the blade attachment device (1410) contacts the blade (100) are able to be distributed over a larger area of the blade (100), which minimizes the risk of damage to the blade (100). In a particular embodiment, the method may further include the step of positioning the blade (100) so that a leading-to-trailing edge axis (150) is at least twenty-five degrees from a wind direction. Moreover, the method may further include the step of positioning the blade (100) so that a leading-to-trailing edge axis (150) is at least forty-five degrees from a wind direction. Even further, the method may further include the step of positioning the blade (100) so that a leading-to-trailing edge axis (150) is at least seventy-five degrees from a wind direction, which as seen in FIG. 9 is about ninety-five degrees. In addition to providing a larger surface area of the blade (100) for the blade attachment device (1430) to contact, such positioning can reduce stresses on the blade (100) caused by the wind when making repairs.

Figure 8:
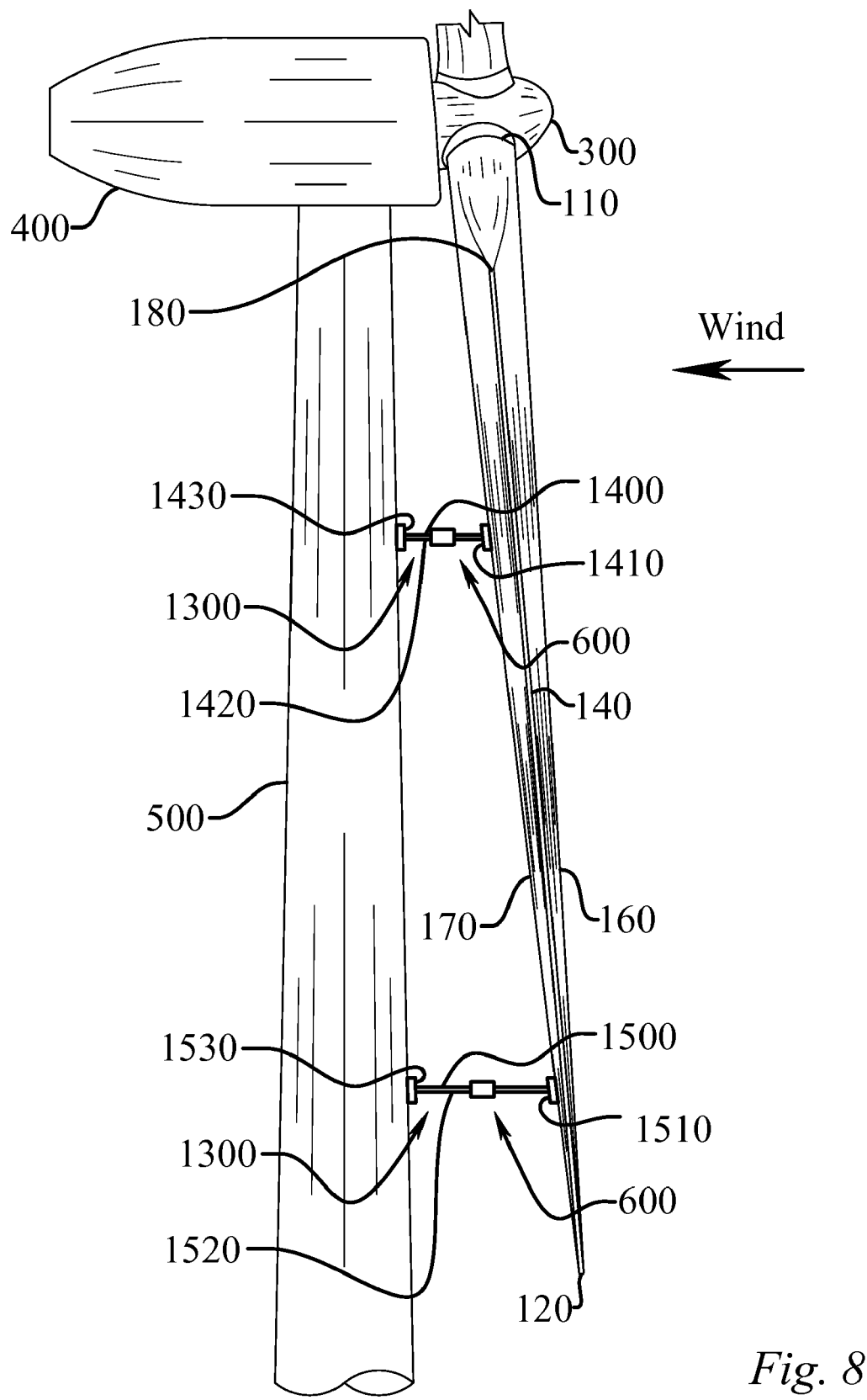
FIG. 8 shows an embodiment of a blade reinforcement structure secured to the wind turbine blade, not to scale.

Using a single adjustable blade-to-tower support (1400) may not sufficiently stabilize the blade (100) throughout the entire length of the blade (100), and thus the blade (100) may still be subject to stresses that could compromise any repairs made to the blade (100). Therefore, in another embodiment, the load transfer structure (1300) may further include a secondary adjustable blade-to-tower support (1500) having a secondary blade attachment device (1510), a secondary longitudinally adjustable device (1520), and a secondary tower attachment device (1530), as seen in FIG. 8. The secondary adjustable blade-to-tower support (1500) and its components may be constructed according to the principles discussed above with respect to the adjustable blade-to-tower support (1400) and its components. By providing a secondary adjustable blade-to-tower support (1500), the blade (100) may be stabilized such that the load on the blade (100) is counteracted at two separate points to further reduce stress in the vicinity of the damaged portion (230). Preferably, when utilizing an adjustable blade-to-tower support (1400) and a secondary adjustable blade-to-tower support (1500), one adjustable blade-to-tower support (1400, 1500) is positioned above a damaged portion (230) of the blade (100) to be repaired, and the remaining adjustable blade-to-tower support (1400, 1500) is positioned below the damaged portion (230). This ensures that at least the damaged portion (230) of the blade (100) is stabilized when repairs are carried out. Further, one skilled in the art will understand that it may be desirable for the supports (1400, 1500) to act in opposite directions. For instance, in the illustrated example of FIG. 8 the secondary adjustable blade-to-tower support (1500) may be forcing the deflected blade tip (120) away from the tower (500), while the adjustable blade-to-tower support (1400) is pulling a portion of the blade (100) toward the tower (500) to reduce stress in the vicinity of the damaged portion (230). Further, one with skill in the art will appreciate that the load transfer structure (1300) may include more than two adjustable blade-to-tower supports (1400, 1500) to further stabilize and reinforce the blade (100) throughout the entire length.

Figure 11:
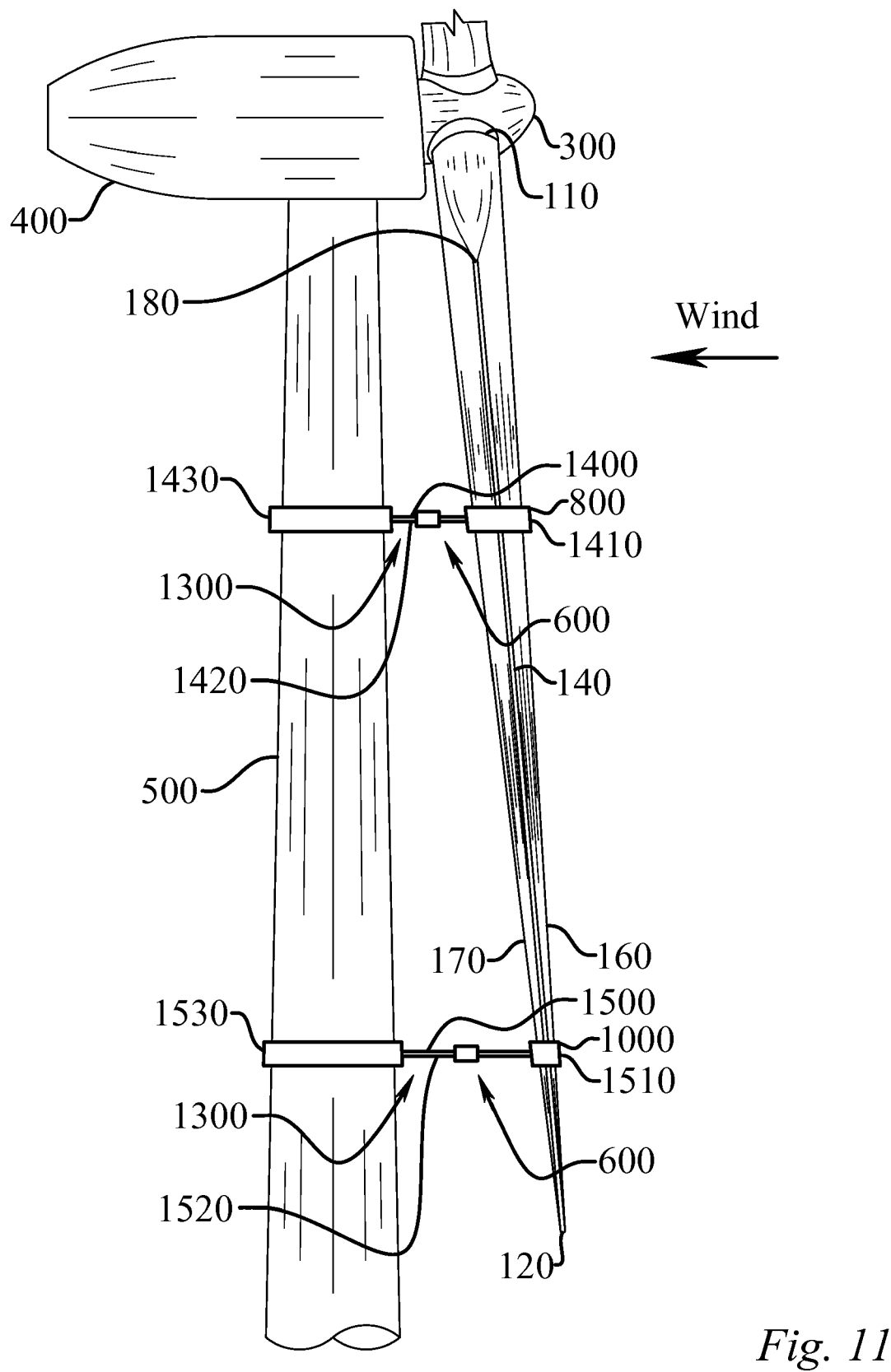
FIG. 11 shows an embodiment of a blade reinforcement structure secured to the wind turbine blade, not to scale.

With reference now to FIG. 11, in one particular embodiment, the blade attachment device (1410) may include a primary proximal clamp (800) for applying a clamping force to the blade (100). Similarly, for an embodiment having a secondary adjustable blade-to-tower support (1500), the secondary blade attachment device (1510) may include a primary distal clamp (1000) for applying a clamping force to the blade (100). Additionally, and as seen in FIG. 11, the tower attachment device (1430) and the secondary tower attachment device (1530) may be formed as clamping devices that apply a clamping force to the tower (500) to secure the adjustable blade-to-tower supports (1400, 1500) to the tower (500). As previously discussed, the primary proximal and primary distal clamps (800, 1000) should be configured to closely follow the contour of the blade (100) to ensure a secure fit. As such, the primary proximal and primary distal clamps (800, 1000) may include molded portions to conform to the particular contours of the blade (100). Still further, the blade attachment device (1410) and the secondary blade attachment device (1510) may include reinforced vacuum blanket type clamps (800, 1000), as described above and seen in FIG. 18. Moreover, one with skill in the art will appreciate that the primary proximal and primary distal clamps (800, 1000) should be sized and configured such that the clamping forces are distributed evenly and across a large enough area of the blade (100) so that the chances of damaging the blade (100) are minimized.

Figure 12:
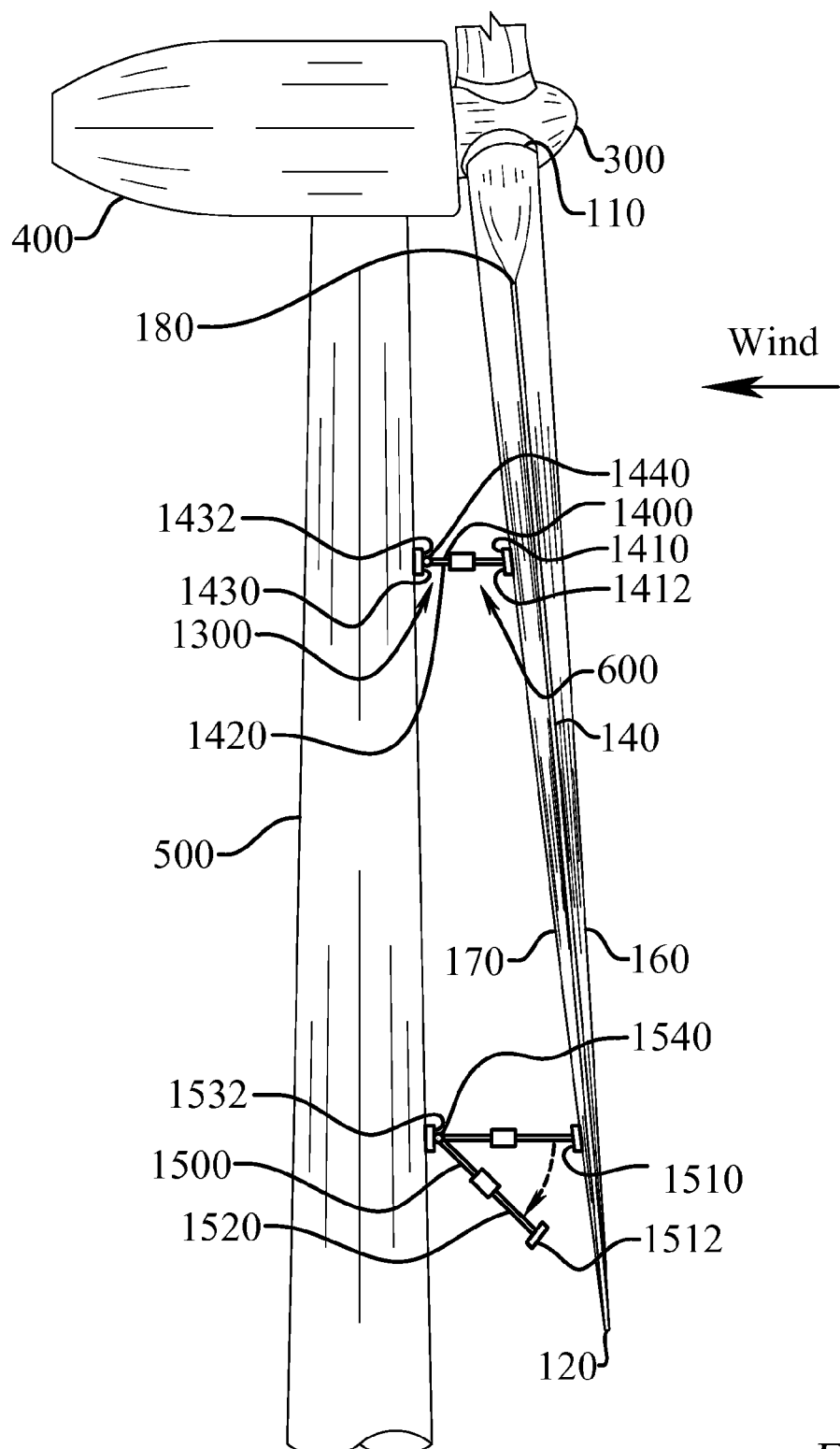
FIG. 12 shows an embodiment of a blade reinforcement structure secured to the wind turbine blade, not to scale.

Referring now to FIG. 12, in another embodiment, the blade attachment device (1410) may include a blade attachment vacuum device (1412) and the tower attachment device (1430) may include a tower attachment vacuum device (1432). Similarly, for an embodiment having a secondary adjustable blade-to-tower support (1500), the secondary blade attachment device (1510) may include a secondary blade attachment vacuum device (1512) and the secondary tower attachment device (1530) may include a secondary tower attachment vacuum device (1532). The blade attachment and tower attachment vacuum devices (1412, 1512, 1432, 1532) may be, by way of example only and not limitation, vacuum pads or vacuum cups that are joined to a vacuum source or a compressed air source. For the reasons previously discussed with respect to the blade and tower attachment devices (1410, 1430), the blade and tower attachment vacuum devices (1412, 1512, 1432, 1532) should likewise be configured to closely follow the contours of the blade (100) and tower (500).

Figure 15:
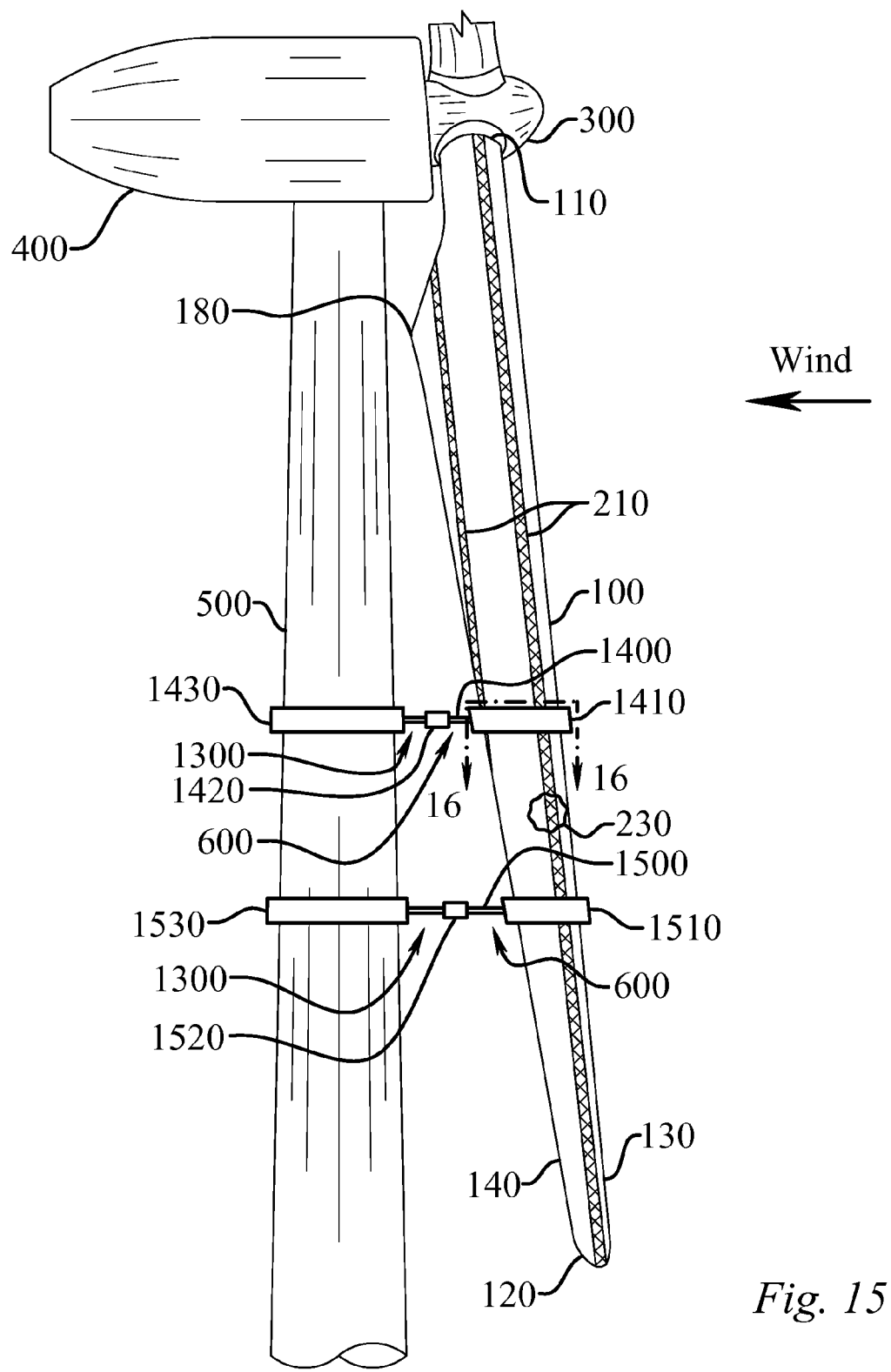
FIG. 15 shows an embodiment of a blade reinforcement structure secured to the wind turbine blade, not to scale.
Figure 16:
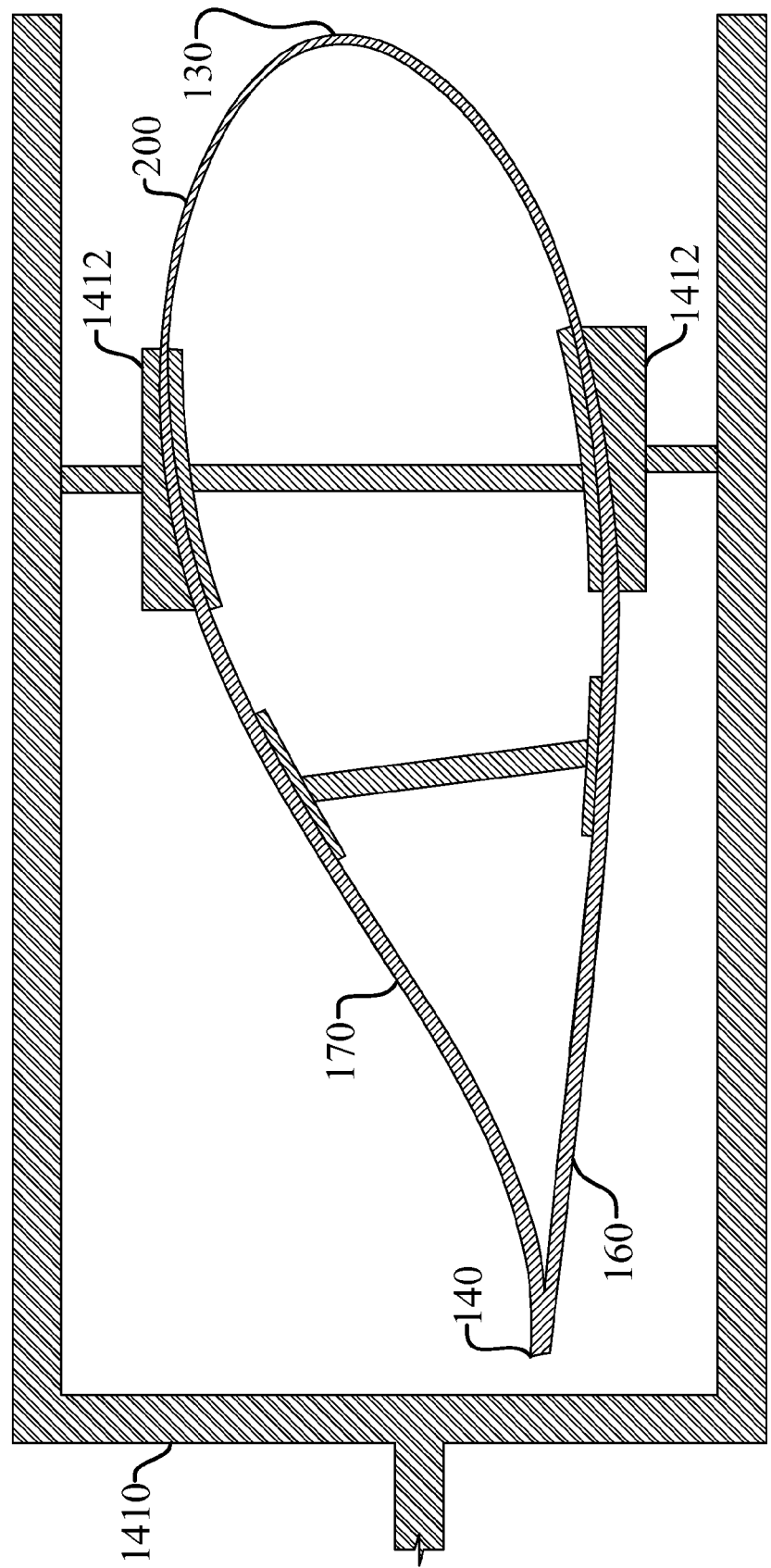
FIG. 16 shows a cross-sectional view of the wind turbine blade taken along section line 16-16 of FIG. 15, not to scale.

With reference now to FIGS. 15 and 16, in one embodiment, the blade attachment device (1410) may comprise a U-shaped bracket member having at least one blade attachment vacuum device (1412). This U-shaped bracket member embodiment allows the blade (100) to be oriented into the wind direction to minimize wind loads on the blade (100) during repair. Thus, the trailing edge (140) may be pointed toward the tower (500), and the blade (100) reinforced from the tower (500), without applying a load directly to the trailing edge (140). Preferably, the blade attachment device (1410) includes at least two blade attachment vacuum devices (1412) so that the blade attachment device (1410) is capable of attachment on the suction side (160) and pressure side (170). Furthermore, it is preferable for the blade attachment vacuum devices (1412) to be movable along the blade attachment device (1410) and to be extendable and retractable from the blade attachment device (1410). As previously described, the blade attachment vacuum devices (1412) may be, by way of example only and not limitation, vacuum pads or vacuum cups that are joined to a vacuum source or a compressed air source. Moreover, the blade attachment vacuum devices (1412) should be capable of closely following the contour of the blade (100). For embodiments having a secondary adjustable blade-to-tower support (1500), the secondary blade attachment device (1510) may be configured in the same manner as the blade attachment device (1400) just described.

In another embodiment, the adjustable blade-to-tower support (1400) may include a hinged joint (1440) and the secondary adjustable blade-to-tower support (1500) may include a secondary hinged joint (1540), as seen in FIG. 12. The hinged joints (1440, 1540) may be located adjacent the tower attachment devices (1430, 1530) so that the adjustable blade-to-tower supports (1400, 1500) are capable of pivoting towards the blade (100). In fact, by providing the adjustable blade-to-tower supports (1400, 1500) with hinged joints (1440, 1450), the adjustable blade-to-tower supports (1400, 1500) may be attached to the tower (500) and pivoted towards the blade (100) when the blade is to be stabilized during repairs, or pivoted towards the tower (500) when the blade (100) is moving. In another embodiment the adjustable blade-to-tower supports (1400, 1500) are permanently attached to the tower (500) thereby eliminating the need to manually install the blade-to-tower supports (1400, 1500) every time a blade (100) is repaired.

The blade (100) may be constructed with stress sensing devices, such as a strain gauge. The stress sensing devices may be arranged along the length of the blade (100), for example, in or on the shell (200), or in or on a spar cap (210). Such stress sensing devices can provide an indication of the actual stresses on the blade (100) and the particular areas of the blade (100) that are under stress. By knowing the amount of stress and the particular locations of stress along the blade (100), the blade reinforcement structure (600) may be adjusted to provide the proper amount of force to neutralize or reduce the stress on a portion of the blade (100). Adjustments to the blade reinforcement structure (600) may be accomplished manually by an operator, or by an automatic control system that adjusts the amount of force exerted by the blade reinforcement structure (600) based on the stress sensed by the stress sensing devices.

After securing the blade reinforcement structure (600) to the blade (100) to reduce stress, the method continues by performing repair operations on the blade (100). Generally, the repair operations include removing a damaged portion (230) of the blade (100), as illustrated in FIG. 2, which is followed by installing a repair portion (240) to the blade (100) where the damaged portion (230) was removed. The damaged portion (230) may be removed through conventional techniques such as grinding, sanding, and cutting operations. For example, a damaged portion (230) of a blade (100) may comprise a delaminated area of the shell (200). To remove the damaged portion (230), the delaminated area may be cut out or ground down to a depth corresponding to the deepest damage. It should be noted that removal of the damaged portion (230) does not require removal of an entire portion of the blade (100), although such removal may be possible. After the damaged portion (230) is removed, a repair portion (240) may be installed. The repair portion (240) may be thought of as material that is intentionally added to the blade (100) to restore the blade's (100) physical state or mechanical properties. Installation of the repair portion (240) may comprise applying multiple layers of an appropriate resin/hardener mixture and fiberglass plies to the removed damaged portion (230). Moreover, installation of the repair portion (240) may simply comprise filling the removed damaged portion (230) with an appropriate filler compound, such as an epoxy, a polyester, or a polyurethane, just to name a few. One with skill in the art will appreciate that any conventional wind turbine blade (100) repair technique or operation, such as scarf patch repairs or plug and patch repairs to name a couple, may be utilized to remove a damaged portion (230) and install a repair portion (240).

In another embodiment, the method may further include the step of enclosing the damaged portion (230) of the blade (100) within a containment structure (620), as seen in FIG. 6. This step is preferably performed subsequent to securing the blade reinforcement structure (600) to the blade (100) and prior to performing any repair operations on the blade (100). The containment structure (620) allows the damaged portion (230) of the blade (100) to be shielded from the external environment when repairs are made. Moreover, the containment structure (620) prevents contaminants and particulates created during the repair process from entering the external environment. The containment structure (620) should be configured to provide a tight seal around the blade (100), both above and below the damaged portion (230). Additionally, the containment structure (620) should be sized to allow at least one worker to easily access and make repairs to the blade (100). For example, the containment structure (620) may be about three meters tall and provide a space extending at least two meters in all directions from the surface of the blade (100). As seen in FIG. 6, the containment structure (620) encloses the damaged portion (230) of the blade (100), as well as the reinforcement structure work platform (610). Preferably the containment structure (620) is constructed of a plastic material that is also waterproof, such as a polypropylene tarpaulin. Moreover, the containment structure (620) may include a frame to help support the plastic material.

As mentioned above, the containment structure (620) is configured to shield workers from the external environment when carrying out repairs. Typically, it is considered unsafe in the industry to attempt blade repairs when the wind speed is above 8 m/s. However, the present containment structure (620) allows workers to safely perform blade work when wind speeds are above 8 m/s without the risk of losing balance due to strong wind gusts. Additionally, the containment structure (620) shields the portion of the blade (100) being worked upon from the direct effects of the wind, which can reduce stresses on the portion of the blade (100) being repaired.

The containment structure (620) may be equipped with a number of features to facilitate repair work while avoiding exposure to external conditions. For example, the containment structure (620) may include multiple power outlets that are supplied with electrical power from ground or tower based generators to provide a power source for tools or lighting. The containment structure (620) may also include air lines supplied with air from ground or tower based air compressors. Further, the containment structure (620) may include its own lighting system to provide workers with appropriate lighting to carry out repairs.

In yet another embodiment, the method may further include the step of controlling the temperature of the air within the containment structure (620). This step may be accomplished by providing the containment structure (620) with access to an HVAC system, as seen in FIG. 6. Such an embodiment provides the ability to perform necessary repair work in extreme high or extreme low temperatures, which might otherwise be postponed until favorable conditions are achieved. Moreover, controlling the air temperature within the containment structure (620) allows the worker to create a more pleasant working environment regardless of the external environment. In addition, many of the materials used to repair the blade (100) may need to undergo a temperature controlled curing process. As such, the step of controlling the air temperature within the containment structure (620) allows the containment structure (620) to be heated or cooled so that the repair portion (240) of the blade may properly cure. Moreover, the method may further include the step of controlling the humidity of the air within the containment structure (620). This step may also be accomplished by utilizing the HVAC system, which may be remotely located or positioned near the repair portion (240).

As mentioned above, the containment structure (620) prevents contaminants and particulates created during the repair process from entering the external environment. However, entrapping the contaminants and particulates within the containment structure (620) can pose a safety hazard to workers within the containment structure (620). Thus, to further ensure the safety of the workers, the containment structure (620) may be provided with access to a dust collection system, as seen in FIG. 6.

After the blade (100) has been repaired by installing the repair portion (240), the method concludes by removing the blade reinforcement structure (600) from the blade (100). Of course, the method may be repeated on the wind turbine's remaining blades (100) should they require any repairs.

Numerous alterations, modifications, and variations of the preferred embodiments disclosed herein will be apparent to those skilled in the art and they are all anticipated and contemplated to be within the spirit and scope of the claimed method. For example, although specific embodiments of the various apparatus associated with the method have been described in detail, those with skill in the art will understand that the preceding embodiments and variations can be modified to incorporate various types of substitute and or additional or alternative materials, relative arrangement of elements, and dimensional configurations. Accordingly, even though only few variations of the various apparatus associated with the method are described herein, it is to be understood that the practice of such additional modifications and variations and the equivalents thereof, are within the spirit and scope of the method as defined in the following claims. The corresponding structures, materials, acts, and equivalents of all means or step plus function elements in the claims below are intended to include any structure, material, or acts for performing the functions in combination with other claimed elements as specifically claimed.

We claim:

1. A method of repairing a wind turbine blade (100) while mounted on a tower (500) without removing the blade (100) from the tower (500), comprising:
   positioning the blade (100) in a substantially vertical orientation;
   suspending a blade reinforcement structure (600) from a nacelle (400) via a hoisting system (1600) including a sinistral cable (1610), a dextral cable (1620), a sinistral hoist (1630), and a dextral hoist (1640), and further including the step of operating the sinistral hoist (1630) and the dextral hoist (1640) to raise the blade reinforcement structure (600) to the damaged portion (230);
   securing the blade reinforcement structure (600) to the blade (100) to reduce stress on a portion of the blade (100) further including the step of securing a clamping structure (700) to the blade (100) including securing a primary proximal clamp (800) and a primary distal clamp (1000) to the blade (100), and further includes the step of rigidly interlocking the primary proximal clamp (800) and the primary distal clamp (1000) with a clamp interlock structure (1200) so that the blade reinforcement structure (600) applies a load to the blade (100) in at least two locations, wherein the damaged portion (230) is located between the primary proximal clamp (800) and the primary distal clamp (1000);
   removing a damaged portion (230) of the blade (100);
   installing a repair portion (240) to the blade (100) where the damaged portion (230) was removed; and
   removing the blade reinforcement structure (600) from the blade (100).

2. The method of claim 1, further including the step of positioning the blade (100) so that a blade leading-to-trailing edge axis (150) is substantially parallel to a wind direction.

3. The method of claim 1, wherein the clamp interlock structure (1200) includes at least a compressive side interlock structure (1202), and further including the step of applying force to the primary proximal clamp (800) and the primary distal clamp (1000) with the compressive side interlock structure (1202) thereby reducing stress on a portion of the blade (100) located between the primary proximal clamp (800) and the primary distal clamp (1000).

4. The method of claim 1, wherein the clamp interlock structure (1200) includes at least a tensile side interlock structure (1204), and further including the step of applying force to the primary proximal clamp (800) and the primary distal clamp (1000) with the tensile side interlock structure (1204) thereby reducing stress on a portion of the blade (100) located between the primary proximal clamp (800) and the primary distal clamp (1000).

5. The method of claim 1, wherein the clamp interlock structure (1200) includes at least a compressive side interlock structure (1202) and a tensile side interlock structure (1204), and further including the step of applying force to the primary proximal clamp (800) and the primary distal clamp (1000) with the compressive side interlock structure (1202) and the tensile side interlock structure (1204) thereby reducing stress on a portion of the blade (100) located between the primary proximal clamp (800) and the primary distal clamp (1000).

6. The method of claim 1, further including the steps of securing a secondary proximal clamp (900) above the primary proximal clamp (800), securing a secondary distal clamp (1100) below the primary distal clamp (1000), interlocking the primary proximal clamp (800) and the secondary proximal clamp (900) with a secondary proximal clamp interlock structure (1210), and interlocking the primary distal clamp (1000) and the secondary distal clamp (1100) with a secondary distal clamp interlock structure (1220).

7. The method of claim 1, wherein the primary proximal clamp (800) is secured above a max chord location (180) and the primary distal clamp (1000) is secured below the max chord location (180).

8. The method of claim 7, wherein the secured primary proximal clamp (800) cannot pass the max chord location (180).

9. The method of claim 1, further including the step of securing a reinforcement structure work platform (610) to the blade reinforcement structure (600).

10. The method of claim 1, further including the step of enclosing the damaged portion (230) of the blade (100) within a containment structure (620).

11. The method of claim 10, further including the step of controlling the temperature of the air within the containment structure (620).

12. The method of claim 11, further including the step of controlling the humidity of the air within the containment structure (620).

13. The method of claim 1, wherein the damaged portion (230) includes at least a portion of a spar cap (210) of the blade (100).

14. The method of claim 1, wherein the step of securing the blade reinforcement structure (600) to the blade (100) further includes the step of stabilizing the blade (100) from the tower (500) by securing a load transfer structure (1300) to the blade (100) and the tower (500), wherein the load transfer structure (1300) includes an adjustable blade-to-tower support (1400) having a blade attachment device (1410), a longitudinally adjustable device (1420), and a tower attachment device (1430).

15. The method of claim 14, further including the step of applying a force to the blade (100) with the load transfer structure (1300).

16. The method of claim 14, wherein the blade attachment device (1410) includes a blade attachment vacuum device (1412) and the tower attachment device (1430) includes a tower attachment vacuum device (1432).

17. The method of claim 14, wherein the blade attachment device (1410) includes a primary proximal clamp (800) applying a clamping force to the blade (100).

18. The method of claim 14, wherein the load transfer structure (1300) is secured to the blade (100) below the damaged portion (230).

19. The method of claim 1, wherein the primary proximal clamp (800) includes a proximal reinforced vacuum blanket including a flexible material and a plurality of reinforcement devices, and further including the step of vacuum attaching the reinforced vacuum blanket against the blade (100).

20. A method of repairing a wind turbine blade (100) while mounted on a tower (500) without removing the blade (100) from the tower (500), comprising:
 positioning the blade (100) in a substantially vertical orientation;
 securing a blade reinforcement structure (600) to the blade (100) to reduce stress on a portion of the blade (100);
 enclosing a damaged portion (230) of the blade (100) within a containment structure (620) and controlling the temperature of the air within the containment structure (620);
 removing the damaged portion (230) of the blade (100);
 installing a repair portion (240) to the blade (100) where the damaged portion (230) was removed; and
 removing the blade reinforcement structure (600) and the containment structure (620) from the blade (100).

21. The method of claim 20, further including the step of controlling the humidity of the air within the containment structure (620).

22. The method of claim 20, wherein the step of securing a blade reinforcement structure (600) to the blade (100) further includes the step of securing a clamping structure (700) to the blade (100) including securing a primary proximal clamp (800) and a primary distal clamp (1000) to the blade (100), and further includes the step of interlocking the primary proximal clamp (800) and the primary distal clamp (1000) with a clamp interlock structure (1200), wherein the damaged portion (230) is located between the primary proximal clamp (800) and the primary distal clamp (1000).

23. The method of claim 22, wherein the clamp interlock structure (1200) includes at least a compressive side interlock structure (1202), and further including the step of applying force to the primary proximal clamp (800) and the primary distal clamp (1000) with the compressive side interlock structure (1202) thereby reducing stress on a portion of the blade (100) located between the primary proximal clamp (800) and the primary distal clamp (1000).

24. The method of claim 22, wherein the clamp interlock structure (1200) includes at least a tensile side interlock structure (1204), and further including the step of applying force to the primary proximal clamp (800) and the primary distal clamp (1000) with the tensile side interlock structure (1204) thereby reducing stress on a portion of the blade (100) located between the primary proximal clamp (800) and the primary distal clamp (1000).

25. The method of claim 22, wherein the clamp interlock structure (1200) includes at least a compressive side interlock structure (1202) and a tensile side interlock structure (1204), and further including the step of applying force to the primary proximal clamp (800) and the primary distal clamp (1000) with the compressive side interlock structure (1202) and the tensile side interlock structure (1204) thereby reducing stress on a portion of the blade (100) located between the primary proximal clamp (800) and the primary distal clamp (1000).

26. A method of repairing a wind turbine blade (100) while mounted on a tower (500) without removing the blade (100) from the tower (500), comprising:
 positioning the blade (100) in a substantially vertical orientation;

securing a blade reinforcement structure (600) to the blade (100) to reduce stress on a portion of the blade (100) wherein the step of securing a blade reinforcement structure (600) to the blade (100) further includes the step of securing a clamping structure (700) to the blade (100) including securing a primary proximal clamp (800) and a primary distal clamp (1000) to the blade (100), and further includes the step of interlocking the primary proximal clamp (800) and the primary distal clamp (1000) with a clamp interlock structure (1200), wherein the damaged portion (230) is located between the primary proximal clamp (800) and the primary distal clamp (1000), and wherein the clamp interlock structure (1200) includes at least a compressive side interlock structure (1202), and further including the step of applying force to the primary proximal clamp (800) and the primary distal clamp (1000) with the compressive side interlock structure (1202) thereby reducing stress on a portion of the blade (100) located between the primary proximal clamp (800) and the primary distal clamp (1000);

removing a damaged portion (230) of the blade (100);

installing a repair portion (240) to the blade (100) where the damaged portion (230) was removed; and removing the blade reinforcement structure (600) from the blade (100).

27. The method of claim 26, wherein the clamp interlock structure (1200) includes at least a tensile side interlock structure (1204), and further including the step of applying force to the primary proximal clamp (800) and the primary distal clamp (1000) with the tensile side interlock structure (1204) thereby reducing stress on a portion of the blade (100) located between the primary proximal clamp (800) and the primary distal clamp (1000).

28. The method of claim 26, wherein the clamp interlock structure (1200) includes at least a compressive side interlock structure (1202) and a tensile side interlock structure (1204), and further including the step of applying force to the primary proximal clamp (800) and the primary distal clamp (1000) with the compressive side interlock structure (1202) and the tensile side interlock structure (1204) thereby reducing stress on a portion of the blade (100) located between the primary proximal clamp (800) and the primary distal clamp (1000).

29. The method of claim 26, further including the step of securing a reinforcement structure work platform (610) to the blade reinforcement structure (600).

30. The method of claim 26, further including the step of enclosing the damaged portion (230) of the blade (100) within a containment structure (620).

31. The method of claim 30, further including the step of controlling the temperature of the air within the containment structure (620).

32. The method of claim 31, further including the step of controlling the humidity of the air within the containment structure (620).

33. A method of repairing a wind turbine blade (100) while mounted on a tower (500) without removing the blade (100) from the tower (500), comprising:

positioning the blade (100) in a substantially vertical orientation;

securing a blade reinforcement structure (600) to the blade (100) to reduce stress on a portion of the blade (100);

stabilizing the blade (100) from the tower (500) by securing a load transfer structure (1300) to the blade (100) and the tower (500), wherein the load transfer structure (1300) includes an adjustable blade-to-tower support (1400) having a blade attachment device (1410), a longitudinally adjustable device (1420), and a tower attachment device (1430), wherein the blade attachment device (1410) includes a blade attachment vacuum device (1412) and the tower attachment device (1430) includes a tower attachment vacuum device (1432);

applying a force to the blade (100) with the load transfer structure (1300);

removing a damaged portion (230) of the blade (100);

installing a repair portion (240) to the blade (100) where the damaged portion (230) was removed; and removing the blade reinforcement structure (600) from the blade (100).

34. The method of claim 33, wherein the step of securing a blade reinforcement structure (600) to the blade (100) further includes the step of securing a clamping structure (700) to the blade (100) including securing a primary proximal clamp (800) and a primary distal clamp (1000) to the blade (100), and further includes the step of interlocking the primary proximal clamp (800) and the primary distal clamp (1000) with a clamp interlock structure (1200), wherein the damaged portion (230) is located between the primary proximal clamp (800) and the primary distal clamp (1000).

35. The method of claim 34, wherein the clamp interlock structure (1200) includes at least a compressive side interlock structure (1202), and further including the step of applying force to the primary proximal clamp (800) and the primary distal clamp (1000) with the compressive side interlock structure (1202) thereby reducing stress on a portion of the blade (100) located between the primary proximal clamp (800) and the primary distal clamp (1000).

36. The method of claim 34, wherein the clamp interlock structure (1200) includes at least a tensile side interlock structure (1204), and further including the step of applying force to the primary proximal clamp (800) and the primary distal clamp (1000) with the tensile side interlock structure (1204) thereby reducing stress on a portion of the blade (100) located between the primary proximal clamp (800) and the primary distal clamp (1000).

37. The method of claim 33, further including the step of securing a reinforcement structure work platform (610) to the blade reinforcement structure (600).

38. The method of claim 33, further including the step of enclosing the damaged portion (230) of the blade (100) within a containment structure (620).

39. The method of claim 38, further including the step of controlling the temperature of the air within the containment structure (620).

40. The method of claim 39, further including the step of controlling the humidity of the air within the containment structure (620).

* * * * *